US008234580B2

(12) United States Patent
Bell et al.

(10) Patent No.: US 8,234,580 B2
(45) Date of Patent: Jul. 31, 2012

(54) SYSTEM AND METHOD FOR DYNAMIC SPACE MANAGEMENT OF A DISPLAY SPACE

(75) Inventors: Blaine A Bell, New York, NY (US); Steven A. Feiner, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 944 days.

(21) Appl. No.: 12/124,797

(22) Filed: May 21, 2008

(65) Prior Publication Data

US 2009/0037841 A1 Feb. 5, 2009

Related U.S. Application Data

(63) Continuation of application No. 10/258,510, filed as application No. PCT/US01/13167 on Apr. 24, 2001, now Pat. No. 7,404,147.

(60) Provisional application No. 60/199,147, filed on Apr. 24, 2000, provisional application No. 60/230,958, filed on Sep. 7, 2000.

(51) Int. Cl.
*G06F 3/00* (2006.01)

(52) U.S. Cl. .......................... 715/761; 715/765; 715/788

(58) Field of Classification Search .................. 715/765, 715/790, 800, 801, 788, 806, 761, 784
See application file for complete search history.

(56) References Cited

U.S. PATENT DOCUMENTS

| | | | |
|---|---|---|---|
| 4,642,790 | A | 2/1987 | Minshull et al. |
| 4,819,189 | A | 4/1989 | Kikuchi et al. |
| 5,430,831 | A | 7/1995 | Snellen |
| 5,515,494 | A | 5/1996 | Lentz |
| 5,574,836 | A | 11/1996 | Broemmelsiek |
| 5,657,473 | A | 8/1997 | Killean et al. |
| 5,835,692 | A | 11/1998 | Cragun et al. |
| 5,982,389 | A | 11/1999 | Guneter et al. |

(Continued)

FOREIGN PATENT DOCUMENTS

| | | |
|---|---|---|
| WO | WO95/12194 | 5/1995 |

(Continued)

OTHER PUBLICATIONS

Bernard et al., "Free Space Modeling for Placing Rectangles Without Overlapping," *Journal of Universal Computer Science*, 3(6), Springer Verlag, Jun. 1997, pp. 703-720.

(Continued)

*Primary Examiner* — Tadeese Hailu
(74) *Attorney, Agent, or Firm* — Baker Botts, LLP

(57) ABSTRACT

A method for space management of a workspace provided on a display includes defining a first data structure of full-space rectangles present on the workspace, wherein at least a portion of the full-space rectangles are permitted to overlap. A second data structure of largest empty-space rectangles available on the workspace is also defined to complete the representation of the workspace. The methods include performing an operation on at least one full-space rectangle on the workspace and redefining the first data structure and the second data structure in accordance with the workspace resulting from the operation performed. The operations can include adding a new full-space rectangle, moving an existing full-space rectangle and deleting an existing full full-space rectangle from the workspace. Generally, the workspace is a display device coupled to an electronic device such as a personal computer, personal digital assistant, electronic book viewer and the like.

23 Claims, 17 Drawing Sheets

U.S. PATENT DOCUMENTS

| | | | |
|---|---|---|---|
| 6,008,809 | A | 12/1999 | Brooks |
| 6,115,052 | A | 9/2000 | Freeman et al. |
| 6,215,496 | B1 | 4/2001 | Szeliski et al. |
| 6,266,064 | B1 | 7/2001 | Snyder |
| 6,344,863 | B1 | 2/2002 | Capelli et al. |
| 6,359,603 | B1 | 3/2002 | Zwern |
| 6,654,036 | B1 | 11/2003 | Jones |
| 6,690,393 | B2 | 2/2004 | Heron et al. |
| 6,928,621 | B2 | 8/2005 | Conrad et al. |
| 7,404,147 | B2 | 7/2008 | Bell et al. |
| 7,643,024 | B2 | 1/2010 | Bell et al. |
| 2010/0141648 | A1 | 6/2010 | Bell et al. |

FOREIGN PATENT DOCUMENTS

| | | |
|---|---|---|
| WO | WO01/82279 | 11/2001 |

OTHER PUBLICATIONS

"Free-Space Search for Best Fit Placement of New Desktop Objects," *IBM Technical Disclosure Bulletin*, vol. 37, No. 1, Jan. 1994, pp. 455-456.

Myers, "A Complete and Efficient Implementation of Covered Windows," Computer IEEE Computer Society, Long Beach, CA, vol. 19, No. 9, Sep. 1986, pp. 57-67.

U.S. Appl. No. 10/258,510, Jun. 3, 2008 Issue Fee payment.

U.S. Appl. No. 10/258,510, May 23, 2008 Notice of Allowance.

U.S. Appl. No. 10/258,510, May 2, 2008 Response to Final Office Action.

U.S. Appl. No. 10/258,510, Mar. 4, 2008 Final Office Action.

U.S. Appl. No. 10/258,510, Aug. 3, 2007 Response to Non-Final Office Action.

U.S. Appl. No. 10/258,510, Jun. 7, 2007 Non-Final Office Action.

U.S. Appl. No. 10/258,510, Mar. 12, 2007 Response to Non-Final Office Action.

U.S. Appl. No. 10/258,510, Oct. 13, 2006 Non-Final Office Action.

U.S. Appl. No. 12/496,882, Sep. 7, 2011 Final Office Action.

U.S. Appl. No. 12/496,882, Jun. 27, 2011 Response to Non-Final Office Action.

U.S. Appl. No. 12/496,882, Mar. 25, 2011 Non-Final Office Action.

U.S. Appl. No. 12/496,882, Oct. 25, 2010 Response to Non-Final Office Action.

U.S. Appl. No. 12/496,882, Jun. 25, 2010 Non-Final Office Action.

U.S. Appl. No. 10/477,872, Nov. 20, 2009 Issue Fee payment.

U.S. Appl. No. 10/477,872, Aug. 24, 2009 Notice of Allowance.

U.S. Appl. No. 10/477,872, Jul. 2, 2009 Response to Non-Final Office Action.

U.S. Appl. No. 10/477,872, May 13, 2009 Non-Final Office Action.

U.S. Appl. No. 10/477,872, Feb. 9, 2009 Response to Non-Final Office Action.

U.S. Appl. No. 10/477,872, Aug. 7, 2008 Non-Final Office Action.

U.S. Appl. No. 10/477,872, May 20, 2008 Amendment and Request for Continued Examination (RCE).

U.S. Appl. No. 10/477,872, Nov. 20, 2007 Final Office Action.

U.S. Appl. No. 10/477,872, Oct. 15, 2007 Response to Notice of Non-Compliant.

U.S. Appl. No. 10/477,872, Sep. 13, 2007 Notice of Non-Compliant.

U.S. Appl. No. 10/477,872, Sep. 7, 2007 Response to Non-Final Office Action.

U.S. Appl. No. 10/477,872, Jun. 7, 2007 Non-Final Office Action.

U.S. Appl. No. 10/477,872, Apr. 3, 2007 Response to Final Office Action.

U.S. Appl. No. 10/477,872, Nov. 24, 2006 Final Office Action.

U.S. Appl. No. 10/477,872, Sep. 8, 2006 Response to Non-Final Office Action.

U.S. Appl. No. 10/477,872, Mar. 13, 2006 Non-Final Office Action.

Gobetti et al., "Time-critical multiresolution scene rendering", *Proceedings of the 10th IEEE Visualization 1999 Conference*, Oct. 1999, pp. 1-8.

Samet, "The design and analysis of spatial data structures", *Addison-Wesley*, Reading, MA, 1990.

Thibault et al., "Set operations on polyhedra using binary space partitioning tress", *Computer Graphics*, 21(4): 153-162, Jul. 1987 (Proc. SIGGRAPH '87).

Chen et al., "View interpolation for image synthesis", Sep. 1, 1993, SIGGRAHO '93, Proceedings of the 20th annual conference on Computer Graphics and Interactive Techniques, pp. 279-288.

U.S. Appl. No. 12/496,882, dated Feb. 7, 2012 Amendment and Request for Continued Examination.

U.S. Appl. No. 12/496,882, dated Mar. 1, 2012 Non-Final Office Action.

102

102
200

106
102
200
102

104
102
200

102
200
108

102
200
110
NO PROCESSING INVOLVED
REQUIRES PROCESSING

```
SpaceManager.addFullRectangle(Rectangle F){
  fullSpaceList.add(F)
  CList = existing rectangles in largestEmptySpaceList
    that intersect or are adjacent to F
  Vector possibleLESList[4] = new Vector[4]
  Vector adjacentLESList[4] = new Vector [4]
  for each empty space O in CList{
    if (O adjacent to any side e of F and external to F)
      adjacentLESList[e].add(O)
    else {
      largestEmptySpaceList.delete(O)
      if (O.minx < F.minx)
        possibleLESList[LEFT].add(
          Rectangle(O.minX,F.minX,O.minY,O.maxY))
      if (O.maxX > F.maxX)
        possible LESList[RIGHT].add(
          Rectangle(F.maxX,O.maxX,O.minY,O.maxY))
      if (O.minY > F.minY)
        possible LESList[BOTTOM].add(
          Rectangle(O.minX,O.maxX,OminY,F.minY))
      if (O.maxY > F.maxY)
        possible LESList[TOP].add(
          Rectangle(O.minX,O.maxX,F.maxY,O.maxY))
    }
  }
  for each Direction D in {LEFT,RIGHT,BOTTOM,TOP}{
    for each empty space P in possibleLESList[D]{
      if (P not enclosed by any space in
          adjacentLESList[D] or any other space in
          possibleLESList[D]
        largestEmptySpaceList.add(P)
    }
  }
}
```

FIG. 12

```
SpaceManager.deleteFullRectangle(Rectangle F) {
  remove F from fullSpaceList
  create new Space Manager S to represent area of F
  get all full-space rectangles that intersect F
    and add them to S
  adjacentEmptySpaceList = all largest empty-space
    rectangles adjacent to and external to F
  /* Note: these are the only largest empty spaces external
    to F that need to be processed in this algorithm */
  /* possibleLESList is a temporary list of
    empty spaces that could possibly be largest empty
    spaces; initialize it to the empty spaces in S */
  possibleLESList = S.largestEmptySpaceList
    for each edge e in (LEFT,RIGHT,BOTTOM,TOP) {
  adjList = spaces in possibleLESList adjacent to edge e of F
  for each empty space R in adjList {
    for each empty space P in adjacentEmptySpaceList {
      if (P adjacent to edge e of R and edge e of F)
        possibleLESList.add(combineSpaces (R,P))
        /* see Figure 15 for function combineSpaces */
      }
      if (any rectangle in possibleLESList encloses R)
        remove R from possibleLESList
  }
 }
 for each empty space R in adjacentEmptySpaceList{
   if (R enclosed by a rectangle in possibleLESList)
     largestEmptySpaceList.delete(R)
 }
 for each empty space R in possibleLESList{
   if (R not enclosed by any other space in
       possibleLESList)
     largestEmptySpaceList.add(R)
 }
}
```

FIG. 13

```
Method combineSpaces(Rectangle R1, Rectangle R2) {
  if (isAdjacentInX(R1,R2))
    return (Rectangle (MIN(R1.minX,R2.minX),
                       MAX(R1.minY,R2.minY),
                       MAX(R1.maxX,R2.maxX),
                       MIN(R1.maxY,R2.maxY))),
  else if (isAdjacentInY(R1,R2))
    return (Rectangle(MAX(R1.minX.R2.minX),
                      MIN(R1.minY,R2.minY),
                      MIN(R1.maxX,R2.maxX),
                      MAX(R1.maxY.R2.maxY)))
```

FIG. 15

SYSTEM AND METHOD FOR DYNAMIC SPACE MANAGEMENT OF A DISPLAY SPACE

CLAIM FOR PRIORITY TO RELATED APPLICATIONS

This application is a continuation of U.S. patent application Ser. No. 10/258,510, filed on Apr. 10, 2003, now U.S. Pat. No. 7,404,147, which is a national stage entry of International Application Serial No. PCT/US2001/13167 filed Apr. 24, 2001, which claims the benefit of U.S. Provisional Patent Application Ser. No. 60/199,147, filed on Apr. 24, 2000, and U.S. Provisional Patent Application Ser. No. 60/230,958, filed on Sep. 7, 2000, each of which is incorporated by reference in its entirety herein.

STATEMENT OF GOVERNMENT RIGHTS

The present invention was made in part with support from the National Library of Medicine, Grant No. 5-R01 LM06593-02 and the Office of Naval Research, Contract Nos. N00014-97-1-0838, N00014-99-1-0249 and N00014-99-1-0394. Accordingly, the United States government may have certain rights to this invention.

BACKGROUND OF THE INVENTION

1. Field of the Invention

The present invention relates generally to user display interfaces, and more particularly relates to a system and method for dynamic space management of a user display interface which efficiently manages available empty-space during both add and remove operations of full-space rectangles.

2. Background of the Related Art

Computer graphics systems which are commonly used today generally provide a representation of the workspace, or display screen, occupied by the various elements of the scene. For example, in the case of a graphical user interface (GUI), such as a window manager for the Microsoft Windows® operating system, various icons and working windows are placed about the display space. In such an environment, it is often desirable to automatically allocate space for a new or modified object while avoiding intersecting or overlaying other objects which have already been allocated on the workspace. This generally either requires adjusting the size of the new object to fit within a selected space or more desirably, finding an available position on the display which maintains the size and aspect ratio of the object to be placed without overlapping previously placed objects. While several systems and methods for simplistic space management of a display have been used previously, such as simple window managers which use automatic tiling or cascading of objects, these systems have shortcomings.

One aspect of effective space management is the modeling and use of the empty-space which is available on the workspace. One method of modeling the empty-space, such as on a user display, is described in the article "Free Space Modeling for Placing Rectangles without Overlapping" by Bernard et al, which was published in the Journal of Universal Computer Science, 3 (6), pp 703-720, Springer-Verlag, June 1997. Bernard et al. describe a method of computing the free space available on a workspace, representing the free space as a set of empty-space rectangles, and using this representation to determine the placement of a new full-space rectangle on the display space in a non-overlapping manner. The modeling of the free space as a set of largest empty-space rectangles as disclosed by Bernard et al. provides an effective representation of the free space. Bernard et al. also disclose managing the workspace and adding new objects in the context of non-overlapping rectangles. However, Bernard et al. do not address the management of the display when two full-space objects overlap and do not provide a process for efficiently updating the empty-space model upon removal of a full-space rectangle from the display workspace. Accordingly, there remains a need for a dynamic space manager which efficiently models the available free space of a workspace in the presence of overlapping objects and during both add and remove operations affecting the workspace.

OBJECTS AND SUMMARY OF THE INVENTION

It is an object of the present invention to provide a method of managing a workspace during the addition and removal of objects from the workspace.

It is another object of the invention to provide a method of managing a workspace, such as a display space, using largest empty-space rectangles to represent the free space and efficiently updating the empty-space representation after an object addition or object deletion operation.

It is a further object of the present invention to provide a method of managing a workspace, such as a display space such that full-space rectangles can be added to existing empty-space or removed from the workspace in an efficient manner.

It is another object of the invention to provide a method of managing a workspace, such as a display space, using largest empty-space rectangles to represent the free space of the workspace where at least some of the full-space objects on the display space overlap.

In accordance with a first method for space management of a workspace provided on a display, a first data structure representing at least a portion of the full-space rectangles present on the workspace is defined and maintained. At least a portion of the full-space rectangles on the workspace are permitted to overlap. A second data structure of largest empty-space rectangles available on the workspace is also defined and maintained. The method further includes performing an operation on the workspace involving at least one full-space rectangle and redefining the first data structure and the second data structure in accordance with the workspace resulting from performing the operation.

The operation which is performed on the workspace can include adding a new full-space rectangle, deleting an existing full-space rectangle, moving an existing full-space rectangle, and modifying an existing full-space rectangle on the workspace. The addition of a new full-space rectangle can include unrestricted manual placement of the rectangle by a user. The addition of a new full-space rectangle can also include automatic placement of the rectangle in a final position on the workspace.

An undoable operation can be implemented by storing a copy of at least a portion of the first and second data structure prior to redefining the first and second data structures, accordingly. In such a case, it is preferred that only the portions of the first and second data structures which are altered by the operation are copied and stored. For example, in an undoable add operation, those empty space rectangles which are removed as a result of the add operation can be saved and those new empty space rectangles which are added to the workspace representation can be marked in the data structure. To undo the add operation, the marked entries in the data structure are removed and the previously removed empty space rectangles are reinstantiated in the second data structure.

In the case where the operation includes adding a new full-space rectangle to the workspace, the step of redefining the first and second data structures can further include adding an entry representing the new full-space rectangle to the first data structure; removing entries from the second data structure representing largest empty space rectangles which are intersected by the new full space rectangle; and adding entries to the second data structure representing the set of new largest empty-space rectangles resulting from the placement of the new full space rectangle.

The full-space rectangles are generally defined, at least in part, by a parameter of the content to be displayed in a full space rectangle. The parameter is generally user defined and can include an area required for the content, a minimum width, a maximum width, a minimum height, a maximum height, an original size, an aspect ratio and the like. The second data structure can be queried to determine the set of available candidate largest empty-space rectangles which can receive the full-space rectangle in accordance with the user parameter.

In the case where there are a number of candidate largest empty-space rectangles which satisfy the user parameter(s), a user defined quality factor can be used to select among the candidate largest empty space rectangles. For example, in the case where a number of largest empty space rectangles are available which have a suitable size and aspect ratio available to receive the full-space rectangle, the user parameter can provide that the empty-space rectangle closest in position to an initial placement of the full-space rectangle is selected to receive the full-space rectangle. Alternatively, the smallest of the available empty-space rectangles with a suitable size and aspect ratio can be selected to receive the full-space rectangle.

To add a degree of freedom in the automatic placement of a full-space rectangle, the size of the full-space rectangle to be added can be reduced by an amount up to a predetermined scaling factor. In this case, the available largest empty-space rectangles include those empty-space rectangles which are at least as large as the original size as reduced by the scaling factor.

The operation performed on the workspace can also be a deletion operation where a full-space rectangle is removed from the workspace. For a deletion operation, the step of redefining the second data structure can include the steps of identifying the edges of the full-space rectangle to be deleted; selecting a first edge of the full-space rectangle to be deleted; identifying each empty-space rectangle in the second data structure which is adjacent to the selected edge; merging the adjacent empty-space rectangles with empty-space generated by deleting the full-space rectangle; adding the merged empty-space rectangle to the second data structure if the merged empty-space rectangle is a largest empty-space rectangle; dropping the merged empty-space rectangle if it is a subset of a previously identified largest empty-space rectangle; and saving the merged empty-space rectangle for a subsequent merging operation if the merged empty-space rectangle is not added or dropped. The next edge of the removed full space rectangle is selected and the saved merged empty space rectangles are used as input empty space rectangles, such that the combination of empty space rectangles progresses in a recursive fashion.

An alternate method in accordance with the invention is applicable to operating a display device in a computer system. The method includes providing a display workspace on the display device wherein content to be displayed to a user is defined in a plurality of full-space rectangles positioned on the workspace. At least a portion of the full-space rectangles are permitted to overlap on the workspace. A first data structure representing at least a portion of the plurality of full-space rectangles present on a workspace of the display device is stored in computer readable media. A second data structure of largest empty-space rectangles available on the workspace is also stored in computer readable media. The largest empty space rectangles are defined by the placement of the portion of the plurality of full-space rectangles stored in the first data structure and the boundaries of the workspace. A user operation is performed on at least one full-space rectangle on the workspace and the first data structure and the second data structure stored in the computer readable media are redefined in accordance with the workspace resulting from the performing step.

A further method for space management of a workspace provided on a display includes defining a first data structure for representing at least a portion of full-space rectangles to be present on the workspace. At least a portion of the full-space rectangles are permitted to overlap on the workspace. The method also includes defining a second data structure of largest empty-space rectangles available on the workspace. An operation to be performed on the workspace involving at least one full-space rectangle which is to be added to the first data structure is initiated and the second data structure is queried to determine the candidate largest empty-space rectangles on the workspace which can accommodate the operation to be performed. One of the candidate largest empty-space rectangles is then selected based on at least one selection parameter and the operation is performed. After performing the operation, the first data structure and the second data structure are redefined in accordance with the workspace resulting from the performing step.

These and other objects and features of the invention will become apparent from the detailed description of preferred embodiments which is to be read in connection with the appended drawings.

BRIEF DESCRIPTION OF THE DRAWINGS

For a more complete understanding of the present invention, and advantages thereof, reference is now made to the following description taken in conjunction with the accompanying drawings, wherein like reference numerals represent like parts, in which:

FIG. 12 is a pseudo-code representation of an exemplary implementation of the method of adding a full space rectangle to the representation of the workspace.

FIG. 13 is a pseudo-code representation of an exemplary implementation of the incremental deletion of a full space rectangle from the representation of the workspace described in connection with FIGS. 7-9.

FIG. 15 is a pseudo-code representation of an exemplary implementation of the method of combining empty space rectangles to form largest empty space rectangles.

DETAILED DESCRIPTION OF PREFERRED EMBODIMENTS

The present method for managing a workspace, such as display space on a user interface, represents both the full space which is allocated to content being provided on the workspace and the empty-space which is available on the workspace. The fall-space representation is a list of fall-space rectangles which are placed on the workspace and for which an area of the workspace is allocated. The empty-space of the workspace is generally represented in a data structure which describes a set of largest empty-space rectangles. The largest empty-space rectangles are generally automatically determined based on the placement of the full-space rectangles on the workspace.

The workspace is generally an electronic display, such as cathode ray tube (CRT), liquid crystal display (LCD), and the like, which is operatively coupled to a computer system or other electronic device. However, it will be appreciated that the workspace is not limited to real time display units and can also include such things as hard copy print outs and data provided to other processes The workspace can also take the form of a number of such electronic displays which are operated in a cooperative fashion as a single display system.

In the present invention in the context of a two-dimensional workspace, full-space rectangles are rectangular regions which represent the rectangular extents of content being displayed on the workspace. Thus, full-space rectangles designate regions of the workspace which are allocated for particular content. Such full space rectangles can generally be permitted to overlap on the workspace, if desired by a user. Generally, while not required, for the sake of simplicity the fall-space rectangles are axis-aligned with the workspace. In higher order dimensional workspaces, such as 3D, 4D and the like, the term full-space rectangle means a unit of content which is defined by mutually orthogonal axes, such as cuboids in a 3d spatial workspace.

An empty-space rectangle is a rectangular region of a 2D workspace which is not occupied by a full-space rectangle. A largest empty-space rectangle is an empty space rectangle whose height and width are at maximums while not overlapping portion of any full-space rectangle on the workspace. As such, each largest empty-space rectangle is bounded by either one or more edges of a full-space rectangle or a border of the workspace. As with full-space rectangles, the concept of the largest empty space rectangle is extensible into n-dimensions of a workspace.

It should be noted that not every object displayed or provided on the workspace needs to be represented in the data structure which defines the set of full space rectangles. For example, if a user wishes to provide content on a display, but does not care if other content is allowed to overlap this content, there does not need to be any alteration of the full space representation or empty space representation of the workspace.

Figures 1A, 1B, 1C, 1D, 1E:
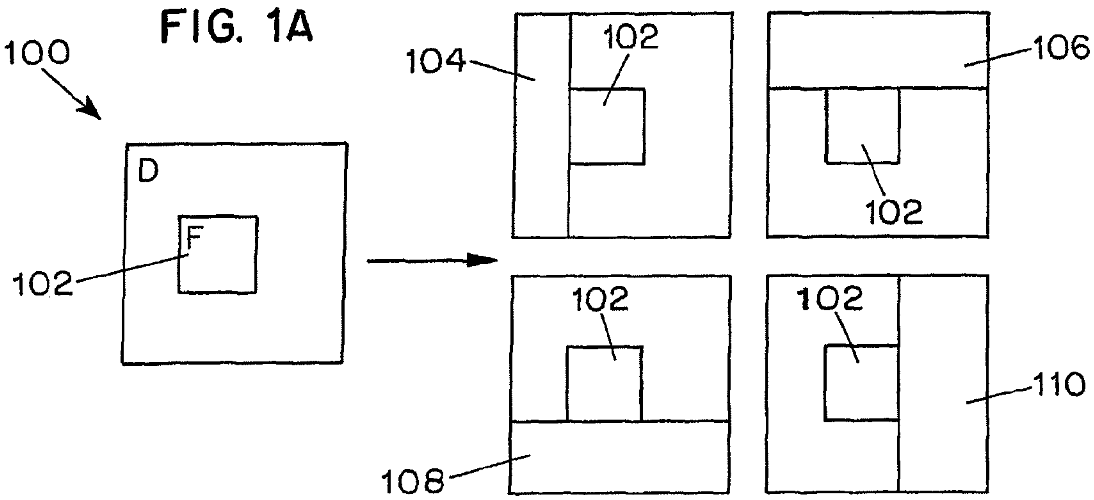
FIGS. 1A-1E are pictorial diagrams illustrating the representation of the empty-space of a workspace as a set of four largest empty-space rectangles.

FIG. 1A is a pictorial diagram illustrating a 2D workspace 100 with a single full-space rectangle 102 placed therein. FIGS. 1B-1E illustrate the four largest empty-space rectangles 104, 106, 108 and 110, respectively, which result from the placement of full-space rectangle 102 on the workspace 100 and adding the full space rectangle to the full-space representation of the workspace. This set of largest empty-space rectangles represents the available areas for the placement of additional full-space rectangles. In the event a new full-space rectangle were to be placed on the workspace, placement parameters of the full-space rectangle, such as the area, dimensions and/or aspect ratio of the new full-space rectangle, can be compared to the empty-space rectangles 104, 106, 108, 110 to determine if any of these empty-space rectangles are candidates to accept the new full-space rectangle.

Figures 2A, 2B, 2C, 2D, 2E, 2F:
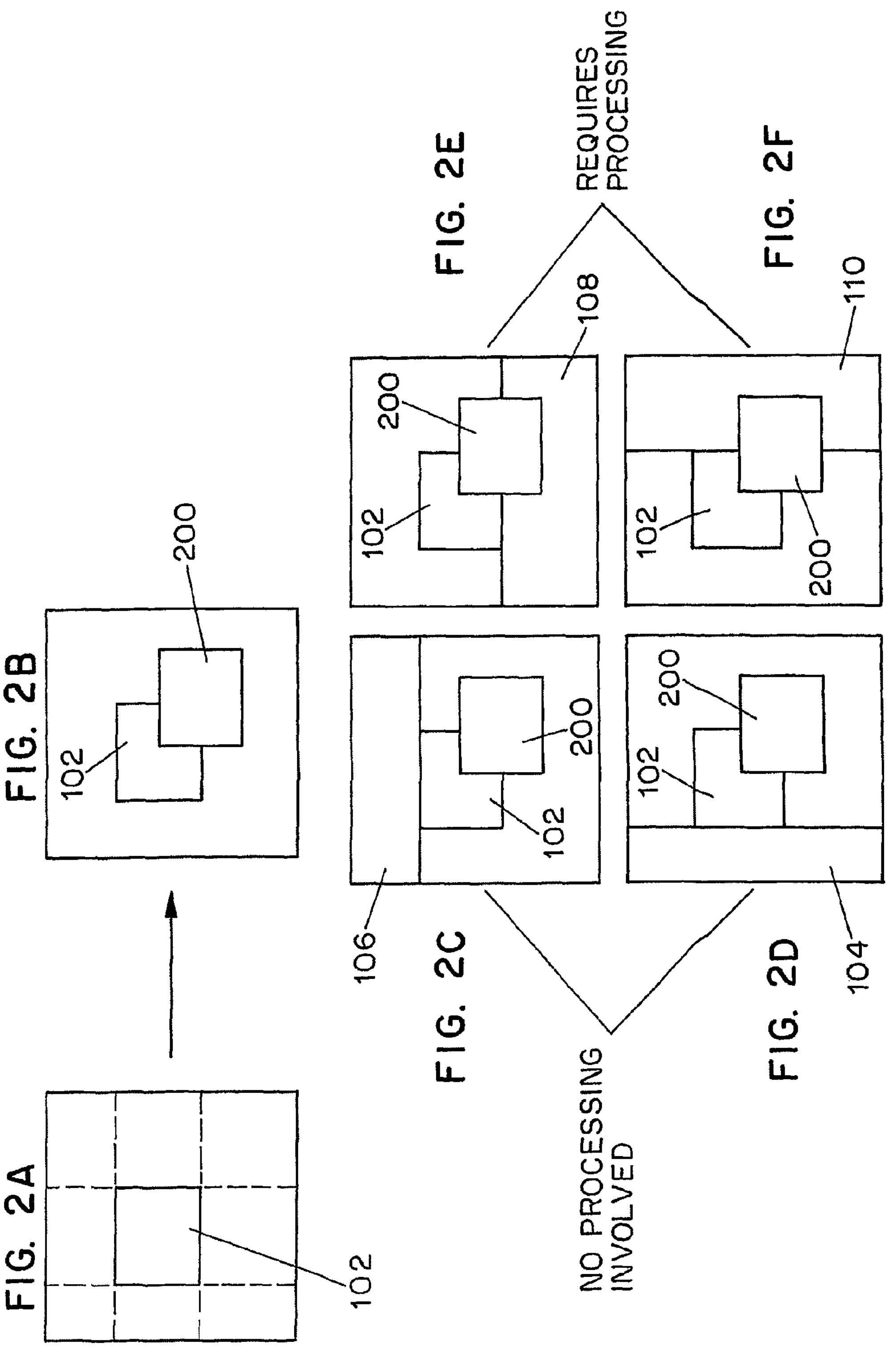
FIGS. 2A-2F are pictorial diagrams illustrating the effect of adding an overlapping full-space rectangle to the empty-space representation of FIG. 1.

As illustrated in FIGS. 2A-2F, the present methods also allow for full-space rectangles to be placed in an overlapping manner by a user. For example, FIG. 2A is essentially the same as that illustrated in FIG. 1A, where a single full-space rectangle 102 defines four largest free-space rectangles 104, 106, 108, 110. FIG. 2B represents the workspace after a user has placed a second full-space rectangle 200 onto the workspace 100 in an overlapping relationship with full-space rectangle 102. Referring to FIGS. 2C and 2D, it is apparent that this placement does not intersect with empty-space rectangles 106, 104, respectively. Accordingly, this portion of the empty-space representation does not need to be altered. However, referring to FIGS. 2E and 2F, the new full-space rectangle does intersect with empty-space rectangles 108, 110 and that these empty-space rectangles must be reduced to define a new set of largest empty-space rectangles for the empty-space representation of the workspace.

Figure 3:
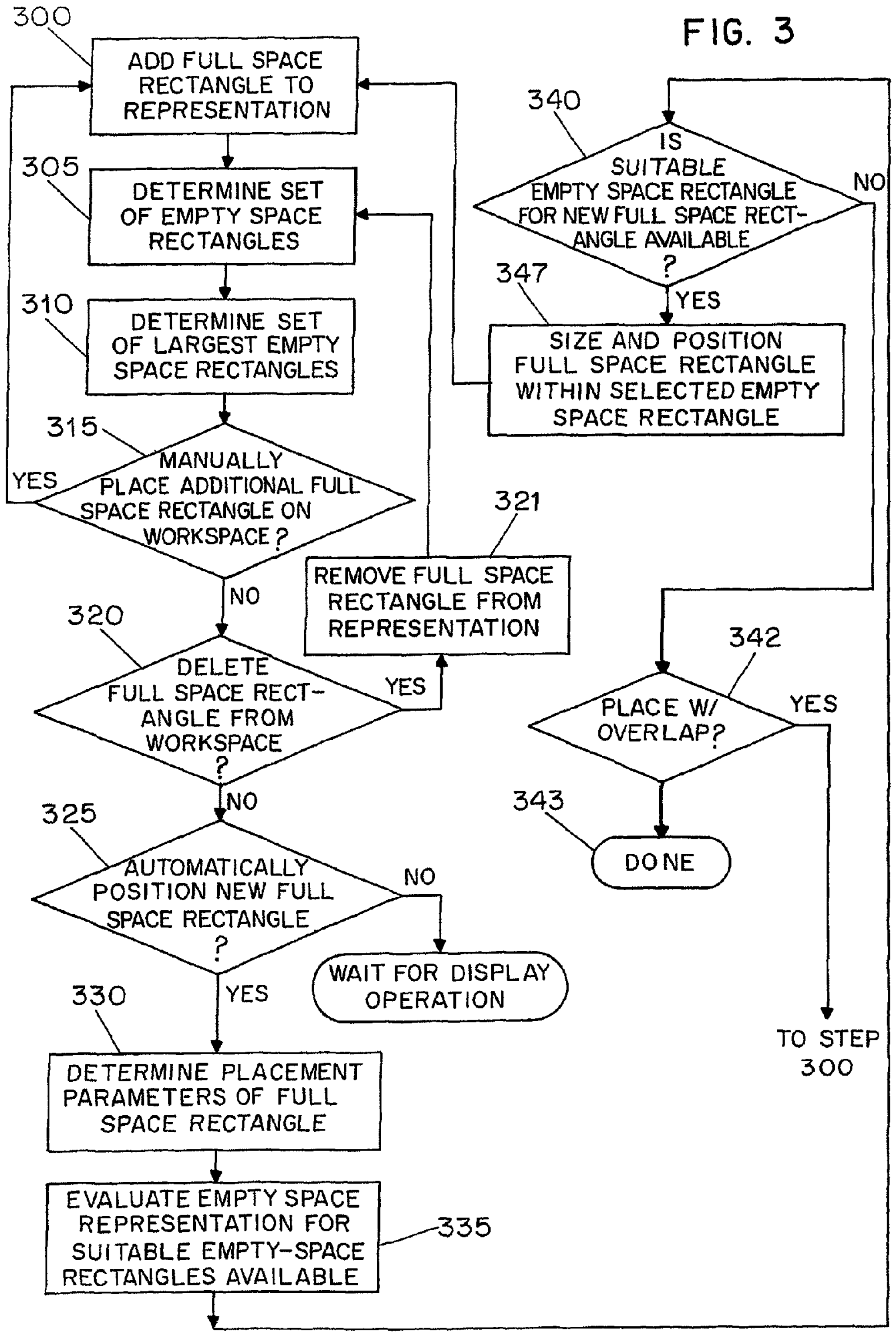
FIG. 3 is a flow chart illustrating an overview of the operation of the present method of space management for a user interface.

FIG. 3 is a flow chart illustrating an overview of the operation of the present method of space management for a user interface. Starting with a blank workspace 100, such as a computer display, electronic book viewing device, personal digital assistant or the like, a first full-space rectangle 102 is placed at an arbitrary position within the workspace. If the user desires that this full space rectangle is to be added to the representation of the workspace and considered in modifying the empty space representation, the full space rectangle is added to the data structure of full space rectangles which are allocated area on the workspace (step 300). As illustrated in FIGS. 1B-1E, this results in a reduction of the available empty-space in the workspace 100 which is represented by a set of empty-space rectangles (step 305). From the set of empty-space rectangles, the set of largest empty-space rectangles is then determined (step 310). It will be appreciated that various methods of determining the set of largest empty space rectangles can be used. It will also be appreciated that steps 305 and 310 may be combined such that the set of largest empty space rectangles is determined in a single operation.

It should be noted that not all content which is presented on the workspace needs to be represented as full-space in the workspace representation. For example, certain content may be displayed as background for other objects which are intended to be placed in an overlapping fashion over the background. Thus, while the background includes content to be displayed, it does not necessarily alter the empty-space representation of the workspace.

Once the empty-space has been represented by the set of largest empty-space rectangles, several subsequent operations are possible. Manual placement of an additional full-space rectangle on the workspace by a user is one such possible operation (step 315). In this case, the placement can be unrestricted as to placement on the workspace 100 such that two or more full-space rectangles are permitted to overlap to any degree. After the manual placement of a full-space rectangle is selected, the full-space rectangle is added to the data representation (step 300) and the representation of the empty-space available on the workspace is again determined by repeating steps 305 and 310.

In addition to manually adding an additional full-space rectangle, an existing full-space rectangle can be removed from the workspace (step 320). Once a full-space rectangle is removed, the full-space rectangle is removed from the representation of the full-space (step 321) and the representation of the empty-space available on the workspace is again determined by repeating steps 305 and 310. In the case of removal, the operations involved in determining the set of free space rectangles (step 305) and determining the set of largest free-space rectangles (step 310) are generally performed in accordance with FIGS. 7-9, and 13 which are described in further detail below.

A third possible operation on the workspace is to place a new full-space rectangle within an available empty-space on the workspace using computer assistance (step 325). If a new full-space rectangle is to be automatically positioned, at least one placement parameter associated with the content is determined (step 330). Numerous parameters can be established by a user to determine the placement of the full-space rectangle. For example, the content may require a certain amount of area on the workspace. The parameter can also include a minimum and/or maximum constraint on the width or height. Further parameters can include the size and aspect ratio of the full-space rectangle. Also, if the user has dropped or dragged the full-space rectangle to an initial approximate position on the workspace, this initial position can also be determined and used as a placement parameter. The parameters described above are merely examples of the types of relevant parameters which a user can apply to the placement of a full space rectangle to the workspace.

Following step 330, the empty-space representation is queried to determine which, if any, of the available largest empty-space rectangles can receive a full space rectangle which satisfies the placement parameter(s) which are in effect and, therefore, are suitable candidates to receive the full-space rectangle (step 335). For example, the query may provide which largest empty-space rectangles have a size and aspect ratio which can accommodate the new full-space rectangle.

In step 340, if there is one or more candidate largest empty-space rectangles available, one of the candidate largest empty-space rectangle which most closely satisfies a user defined quality measure can be selected from the available candidates. As with the placement parameters, the quality measure for selecting among candidate empty space rectangles is largely determined by the specific application and the user's preference. For example, the quality measure may be such that the empty space rectangle which is closest to the initial position of the new full-space rectangle is selected. As another example, quality factor can be such that the largest empty-space rectangle that most closely matches the area or the size and aspect ratio of the new full-space rectangle may be selected. It will be appreciated that these are merely examples and that any number of such user-preference based quality factors can be applied to the selection of the largest empty-space rectangle from a number of available candidates.

If in step 340, there was no suitable candidate empty space rectangle available, the user can be given the option to place the full space rectangle with some degree of overlap with other objects on the workspace (step 342). If the user elects to place with overlap, the process returns to step 300. If the user elects not to place the full space rectangle, the procedure terminates at step 343.

If in step 340 a suitable largest empty space rectangle is selected, the full-space rectangle can be sized and/or positioned within the selected largest empty space rectangle (step 347). Again, user preferences can be used in determining the extent to which the full space rectangle is resized and positioned within the confines of the selected largest empty-space rectangle. Examples include maximizing the size without altering the aspect ratio, maximizing the width or the height, justifying the full space rectangle with respect to one or more borders, etc. Once the size and position are determined, the full space rectangle is added to the workspace representation (step 300) and the empty-space representation of the workspace is redetermined (steps 305, 310).

The operation of determining the set of empty-space rectangles (step 305) after a full-space rectangle is added to the workspace will be described further in connection with FIG. 4 and FIGS. 5A-5I. Referring to the flow chart of FIG. 4, after a full-space rectangle is positioned on the workspace, the empty-space representation is queried to generate a list of largest empty-space rectangles which are adjacent to or overlap the new full space rectangle (step 400). Each edge of the full-space rectangle is identified (step 402). A first edge of the full-space rectangle is selected and is compared against the largest empty-space rectangles in the list of empty-space rectangles to determine if the selected edge intersects any of these rectangles (o) (step 405). If the selected edge (e) intersects an empty-space rectangle (o) in the list, a determination is made as to whether the edge (e) is collinear with an edge of the empty-space rectangle (step 410). If the edge intersects an empty-space rectangle in the list and is not collinear with an edge of the selected largest empty-space rectangle (o), then the empty-space rectangle must be reduced to create new empty-space rectangles (step 415). The new empty-space rectangles will be bounded by the selected edge (e) and either the boundary of the workspace or the edges of the existing empty-space rectangle.

Steps 405 through 415 are repeated for each edge of the full-space rectangle identified in step 400. This can be performed, for example by determining if there are additional edges to be tested (step 420), and if so, selecting the next identified edge (425). If in step 405 it is determined that the edge (e) did not intersect the current empty-space rectangle, then step 420 would be performed to test another edge of the full-space rectangle. Similarly, if in step 410 it is determined that the current edge is collinear with an edge of the empty-space rectangle, than no reduction is required and the process again advances to step 420 to determine if all edges of the full-space rectangle have been tested against the current empty-space rectangle.

After each edge of the full-space rectangle has been tested against the first selected largest empty-space rectangle from the empty-space representation, the empty-space representation is evaluated to determine if there are additional empty-space rectangles to be tested (step 430). If so, the next empty-space rectangle is selected from the empty-space representation (step 435) and steps 400 through 425 are repeated as described above. When this process is complete for all largest empty-space rectangles of the empty-space representation, the resulting empty-space rectangles are evaluated and those which are not largest empty-space rectangles are removed from the representation (step 440).

Figure 4:
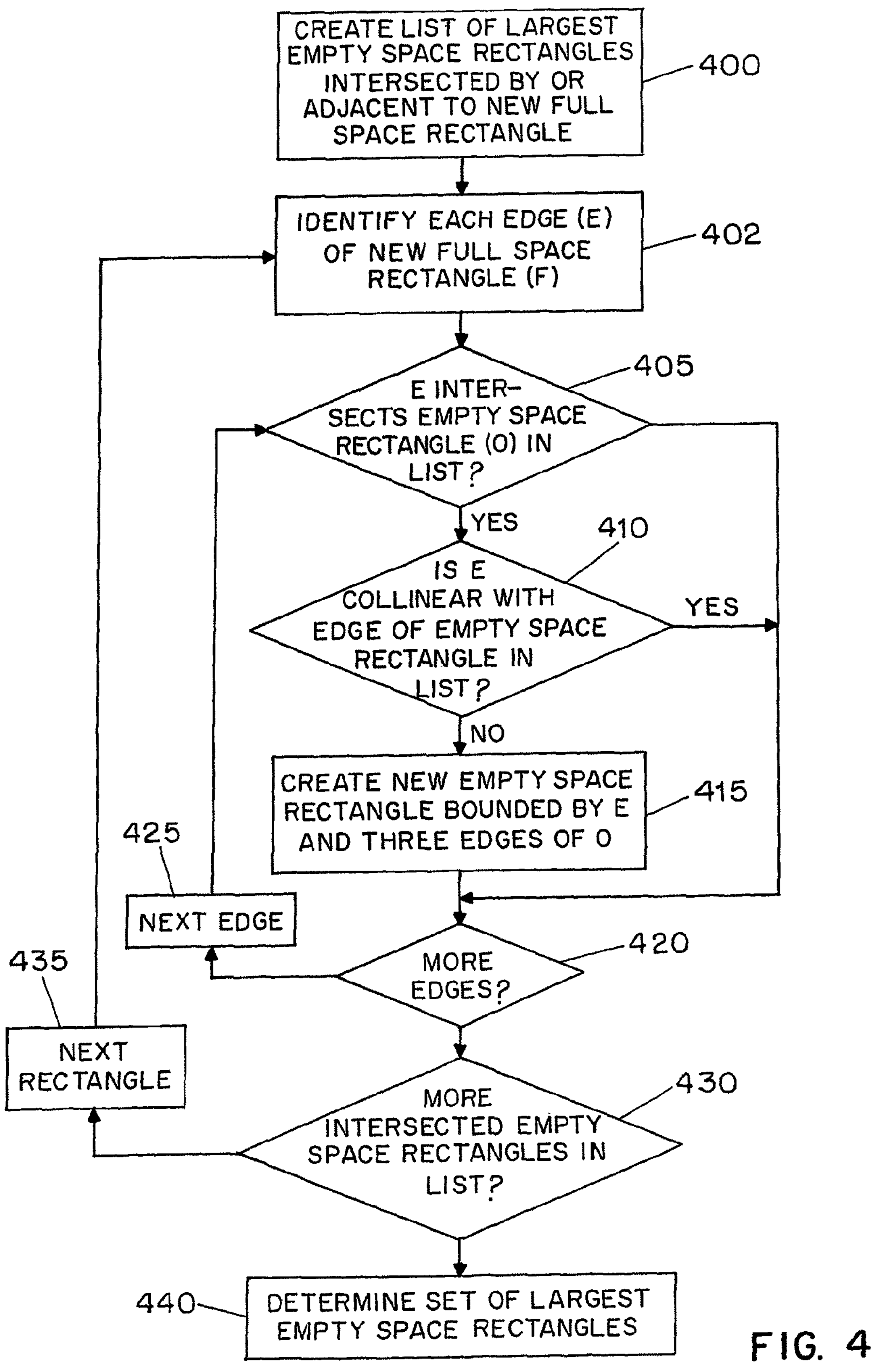
FIG. 4 is a flow chart illustrating the process of adding an additional full-space rectangle to the workspace and redefining the resulting empty-space representation of the workspace.

The process of FIG. 4 can be visualized with reference to the pictorial diagrams of FIG. 2. Referring to FIGS. 2C and 2D, it can be seen that no edge of full-space rectangle 200 intersects largest empty-space rectangles 106, 104, respectively. Accordingly, each edge of rectangle 200 which was tested against largest empty-space rectangles 106, 104 would fail step 405, with the result that no reduction of these spaces is required. To the contrary, in FIGS. 2E and 2F, three of the edges of rectangle 200 intersect with largest empty-space rectangles 108 and 110. Thus, for each of these rectangles, the process of FIG. 4 will advance through step 415 to reduce the empty-space rectangles.

Figures 5A, 5B, 5C, 5D, 5E, 5F, 5G, 5H:
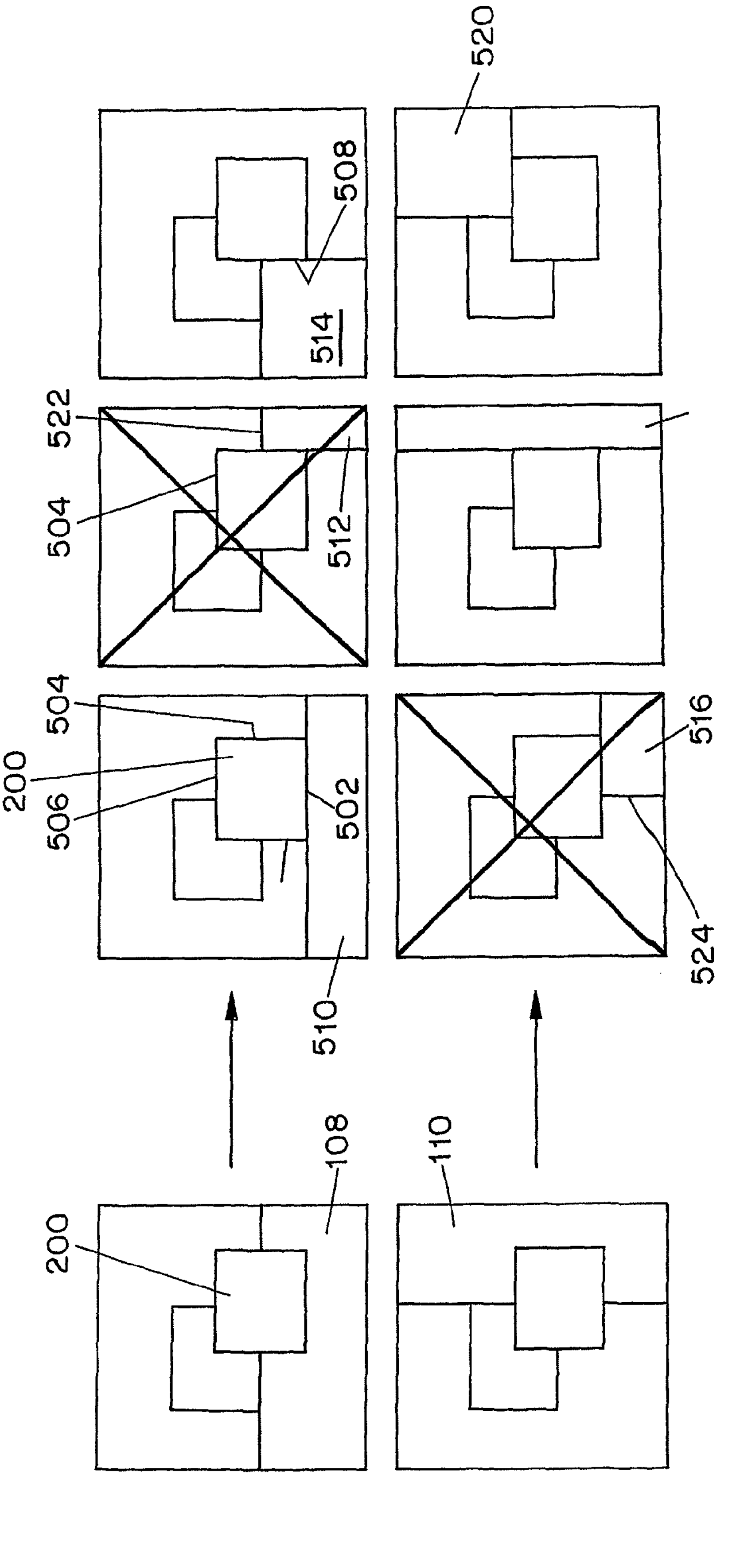
FIGS. 5A-5H are pictorial diagrams illustrating the representation of the empty-space of a workspace after a second, overlapping full-space rectangle is added to the workspace.

Referring to the pictorial diagrams of FIG. 5A, FIG. 5B, FIG. 5C and FIG. 5D, the effect of the intersection of full-space rectangle 200 with empty-space rectangle 108 is demonstrated in accordance with the process illustrated in FIG. 4. Referring to FIG. 5B, edge 502 intersects with empty-space rectangle 108 (step 405) in a non-collinear manner (step 410). Accordingly, a new empty-space rectangle 510 is created which is bounded by edge 502 and three boundaries of empty-space rectangle 108, which in this case coincide with the boundaries of the workspace 100. Similarly, empty-space rectangle 512 is defined by the intersection of edge 504 with empty-space rectangle 108 and empty-space rectangle 514 is defined by the intersection of edge 508 with empty-space rectangle 108. In the same manner, empty-space rectangles 516, 518 and 520 are defined by the non-collinear intersection of edges 502, 504, 506 with largest empty-space rectangle 110.

Empty-space rectangles 510, 512, 514, 516, 518 and 520 are the set of empty-space rectangles generated by the reduction of largest empty-space rectangles 108, 110. However, the largest empty-space rectangles which will make up the representation of the resulting empty-space are a subset of the resulting set of empty-space rectangles. For example, in FIG. 5C, edge 522 of empty-space rectangle 512 is not bounded by either a full-space rectangle or the boundary of the workspace. Accordingly, rectangle 512 is not a largest empty-space rectangle and is dropped from the representation, as indicated by the X through FIG. 5C. Similarly, edge 524 of rectangle 516 is not bounded by either a full-space rectangle or the boundary of the workspace and is also dropped from the final empty-space representation. Thus, after the full-space rectangle 200 is added to the workspace, the resulting representation of the empty-space includes largest empty-space rectangles 104, 106, 510, 514, 518 and 520.

The process of adding a full space rectangle to a workspace, as described above in connection with FIGS. 4 and 5, is further represented in FIG. 12, which is a pseudo code listing representing an embodiment of the process. It will be appreciated that this embodiment is merely illustrative and that various programming implementations can be used in any number of programming languages to implement the present invention.

Figure 6:
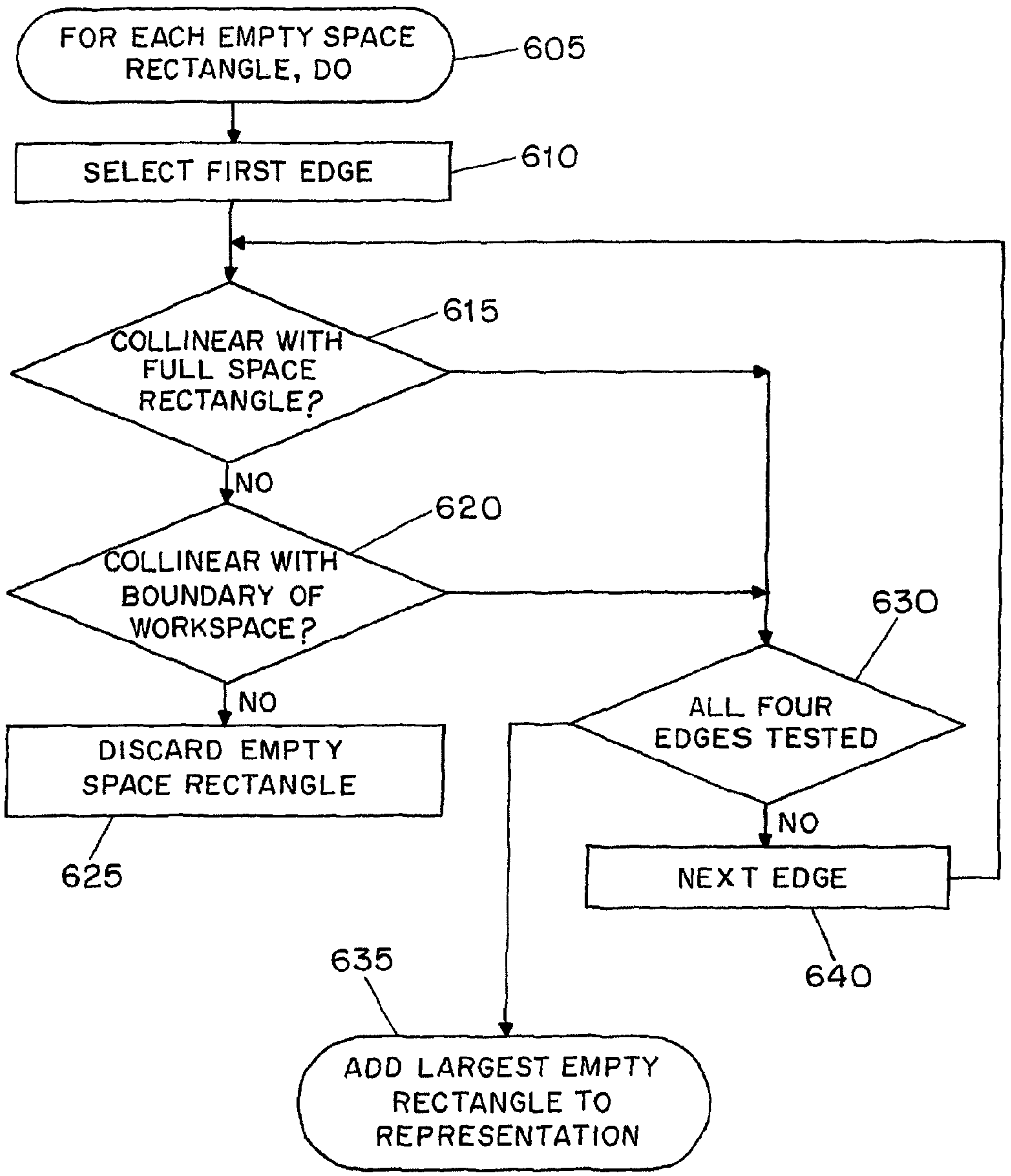
FIG. 6 is a flow chart illustrating the process of determining whether an empty-space rectangle is a largest empty-space rectangle.

The process of determining whether an empty-space rectangle is a member of the set of largest empty-space rectangles is further illustrated in the flow chart of FIG. 6. The process of FIG. 6 is repeated for each empty-space rectangle that is created when a new full-space rectangle is added to the workspace (step 605). The process starts with the selection of a first edge of a first selected empty-space rectangle (step 610). This edge is analyzed to determine if it is collinear with any edge of a full-space rectangle already placed in the workspace (step 615). If not, then the edge is tested to determine whether the edge is collinear with a boundary of the workspace (step 620). If both steps 615 and 620 fail, than the selected empty-space rectangle can be discarded as not being a largest empty-space rectangle (step 625). If additional empty-space rectangles are present, a next empty-space rectangle is selected and the process returns to step 610 for the newly selected rectangle.

If the selected edge is bounded by either a full-space rectangle (step 615) or the boundary of the workspace (step 620), then testing of the empty-space rectangle continues. If all four edges of the empty-space rectangle have been tested (step 630), the current empty-space rectangle is added to the set of largest empty-space rectangles (step 635). If all four edges of the empty-space rectangle have not yet been tested, a next untested edge of the rectangle is selected and the process returns to step 615 (step 640). The process of FIG. 6 adds an empty-space rectangle to the set of largest empty-space rectangles only if all four edges of the rectangle are bounded either by a full-space rectangle or the boundary of the workspace. It will be appreciated that the relative order of testing of these conditions is not critical and that steps 615 and 620 can be interchanged without substantially altering the performance of the method.

Another aspect of the present space management method includes generating an empty-space representation of the workspace after a full-space rectangle is deleted from the workspace. This entails removing the full-space rectangle, F, from the list of full-space rectangles in the representation. It also involves identifying those empty-space rectangles that are included within or are adjacent to the boundaries of F. The empty-space rectangles that are presented by the removal of a full-space rectangle are then analyzed and recursively combined until the maximum extents of the combined empty-space rectangles are obtained. Those combined empty-space rectangles are then evaluated to determine which of the combined empty-space rectangles are largest empty-space rectangles which will be stored in the empty-space representation.

Figure 7:
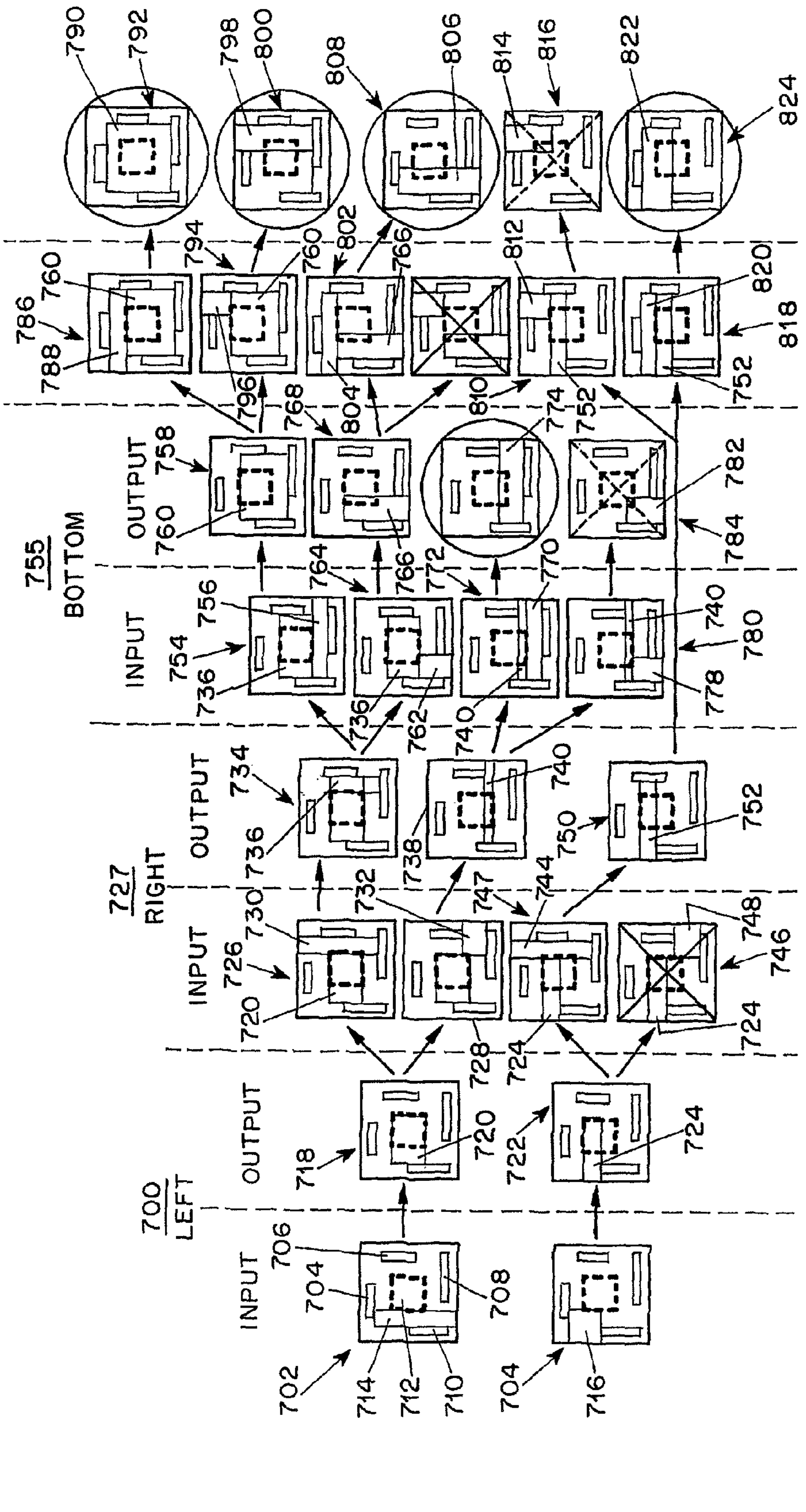
FIG. 7 is a pictorial flow diagram illustrating the recursive combination process performed to redefine the empty-space representation of the workspace upon removal of a full-space rectangle from the workspace.

The pictorial flow diagram of FIG. 7 illustrates an example of the recursive combination of empty-space rectangles which takes place following the deletion of a full-space rectangle. In the individual workspace representation diagrams that form this flow diagram, rectangles 704, 706, 708 and 710 represent full-space rectangles that remain in the workspace. Rectangle 712, delineated by dotted lines, represents a full-space rectangle to be removed from the workspace. The edges of rectangle 712 are analyzed one by one against the largest empty-space rectangles in the empty-space representation to determine where there is adjacent empty-space which can be combined.

Operation 700 illustrates the processing relating to empty-space rectangles 714 and 716 which each have an edge that is collinear with the left edge of rectangle 712. The workspace representation 702 graphically illustrates the input for the combination of rectangles 712 and 714. Workspace representation 718 represents the output state for this combination where empty-space rectangle 720 is formed. The workspace representation 722 illustrates the output which results from the combination of rectangles 712 and 716 illustrated in workspace representation 704 to yield empty-space rectangle 724. As noted above, the combination process is a recursive operation. Thus, empty-space rectangles 720, 724 which are the output solutions for operation 700 on the left edge of rectangle 712 are used as the input rectangles for operation 727 with respect to the right edge of rectangle 712.

Workspace representations 726, 728 illustrate the intersection of rectangle 720 with the free space rectangles 730, 732, respectively, which abut the right edge of removed full-space rectangle 712. Workspace representation 734 illustrates empty-space rectangle 736 which results from the combination of empty-space rectangles 720, 726. Similarly, workspace 738 illustrates the combination of rectangles 720, 732 to generate empty-space rectangle 740. In a similar fashion, workspace representations 742, 746 illustrate right edge processing of rectangle 724 with empty-space rectangles 744, 748, respectively, which have an edge abutting the right edge of rectangle 712. As there is no intersection or abutment between empty-space rectangle 724 and empty-space rectangle 748, there is no combination operation among these two empty-space rectangles, as illustrated by the solid X through workspace representation 746. Workspace representation 750 illustrates the formation of rectangle 752 from the combination of rectangles 724 and 744.

Operation 755 illustrates processing related to the bottom edge of removed full-space rectangle 712. The input rectangles for operation 755 are rectangles 736 and 740 from operation 726 which each have an edge coincident with the bottom edge of rectangle 712. Note that rectangle 752 in workspace 750 of operation 726, does not have any component which intersects with or is coincident with the bottom edge of rectangle 712 and, therefore, is not an input parameter for operation 755. The combination of empty-space rectangles 736 and 756 in workspace representation 754 yield empty-space rectangle 760 depicted in workspace representation 758. The combination of empty-space rectangles 736 and 762 in workspace representation 764 yields empty-space rectangle 766 depicted in workspace representation 768. The combination of empty-space rectangles 740 and 770 in workspace representation 772 yields empty-space rectangle 774 depicted in workspace representation 776. Empty-space rectangle 774 is bounded on the right side by the workspace boundary, on the top edge by full-space rectangle 706, on the left edge by full-space rectangle 710 and on the bottom edge by full-space rectangle 708. Accordingly, as indicated in FIG. 7 by the circle around workspace representation 776, empty-space rectangle 774 is a largest empty-space rectangle which will be added to the empty-space representation and no further processing on this rectangle is required.

Workspace representation 780 illustrates the combination of empty-space rectangles 740 and 778 to yield empty-space rectangle 782 of workspace representation 784. However, rectangle 782 is a subset of rectangle 766 illustrated in workspace representation 768 and, therefore, is not a largest empty-space rectangle. Accordingly, rectangle 782 is dropped from subsequent processing, as illustrated by the dotted X through workspace representation 784.

Operation 785 illustrates the continued processing of empty-space rectangles which are coincident with the top edge of rectangle 712. The input rectangles for this processing operation include empty-space rectangles 760 and 766 from operation 754 as well as empty-space rectangle 752 resulting from operation 726. Workspace representation 786 illustrates the combination of empty-space rectangles 788 and 760 to yield empty-space rectangle 790 of workspace representation 792. Workspace representation 794 illustrates the combination of empty-space rectangles 760 and 796 to generate empty-space rectangle 798 of workspace representation 800. Workspace representation 802 illustrates the combination of empty-space rectangles 804 and 766 to yield empty-space rectangle 806 of workspace representation 808. As indicated by the circles around workspace representations 792, 800 and 808, empty-space rectangles 790, 798 and 806 are largest empty-space rectangles which will be added to the empty-space representation.

Workspace representation 810 illustrates the combination of empty-space rectangles 752 and 812 to yield empty-space rectangle 814 of workspace representation 816. However, empty-space rectangle 814 is fully included in empty-space rectangle 798 shown in workspace representation 800 and is not a largest empty-space rectangle. This is also evident as the bottom edge of rectangle 814 is not bounded by either a full-space rectangle or a boundary of the workspace.

Workspace representation 818 illustrates the combination of empty-space rectangles 752 and 820 to yield empty-space rectangle 822 of workspace representation 824. As indicated by the circle around the workspace representation 824, rectangle 822 is a largest full-space rectangle which will be added to the empty-space representation.

FIG. 15 is a pseudo code listing illustrating one example of an implementation of the process for combining empty space rectangles, which takes place during the operation of deleting a full space rectangle from the workspace representation. It will be appreciated that this embodiment is merely illustrative and that various programming implementations can be used in any number of programming languages to implement the present invention.

Figure 8:
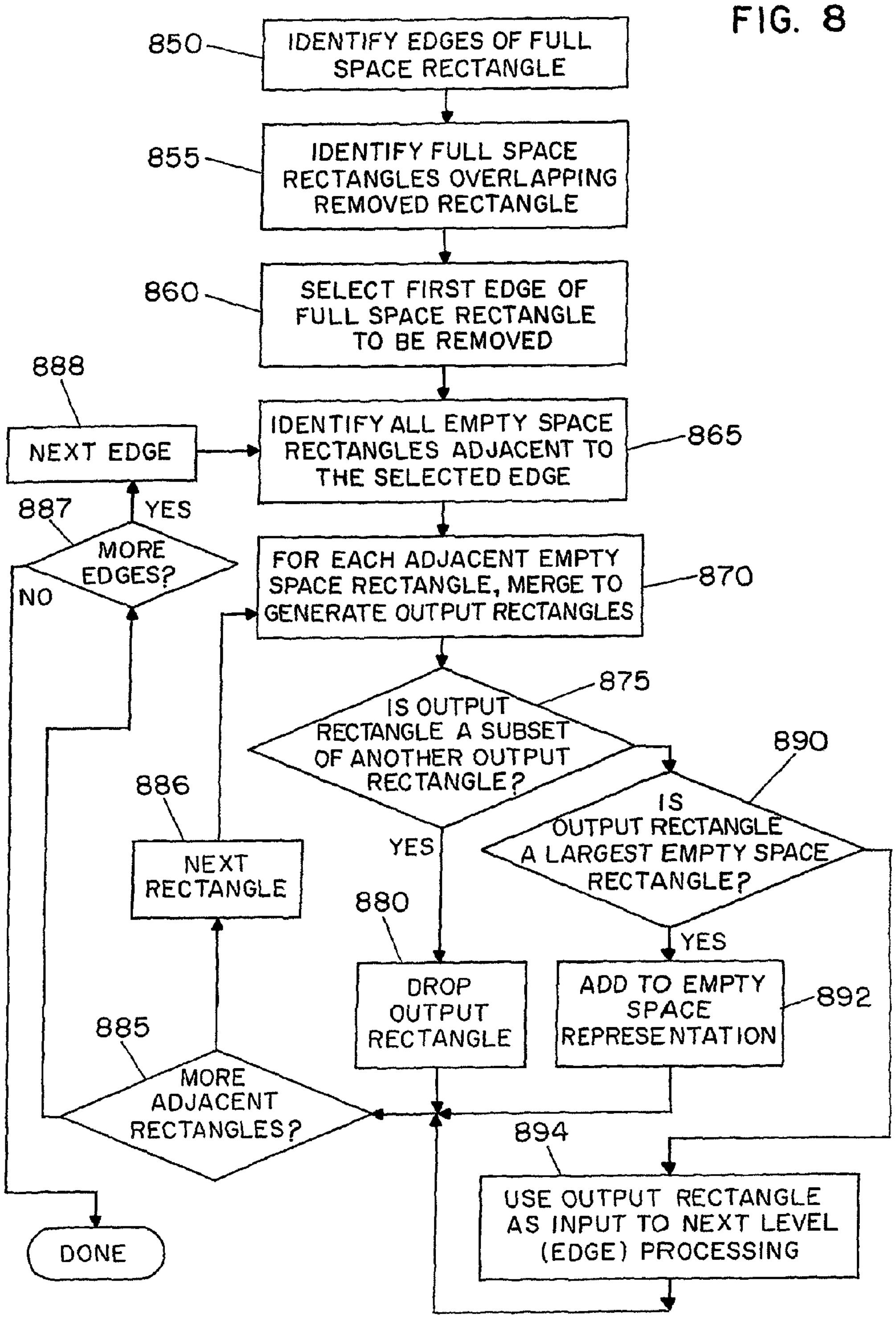
FIG. 8 is a flow chart illustrating the process of removing a full-space rectangle from the workspace.
Figure 9:
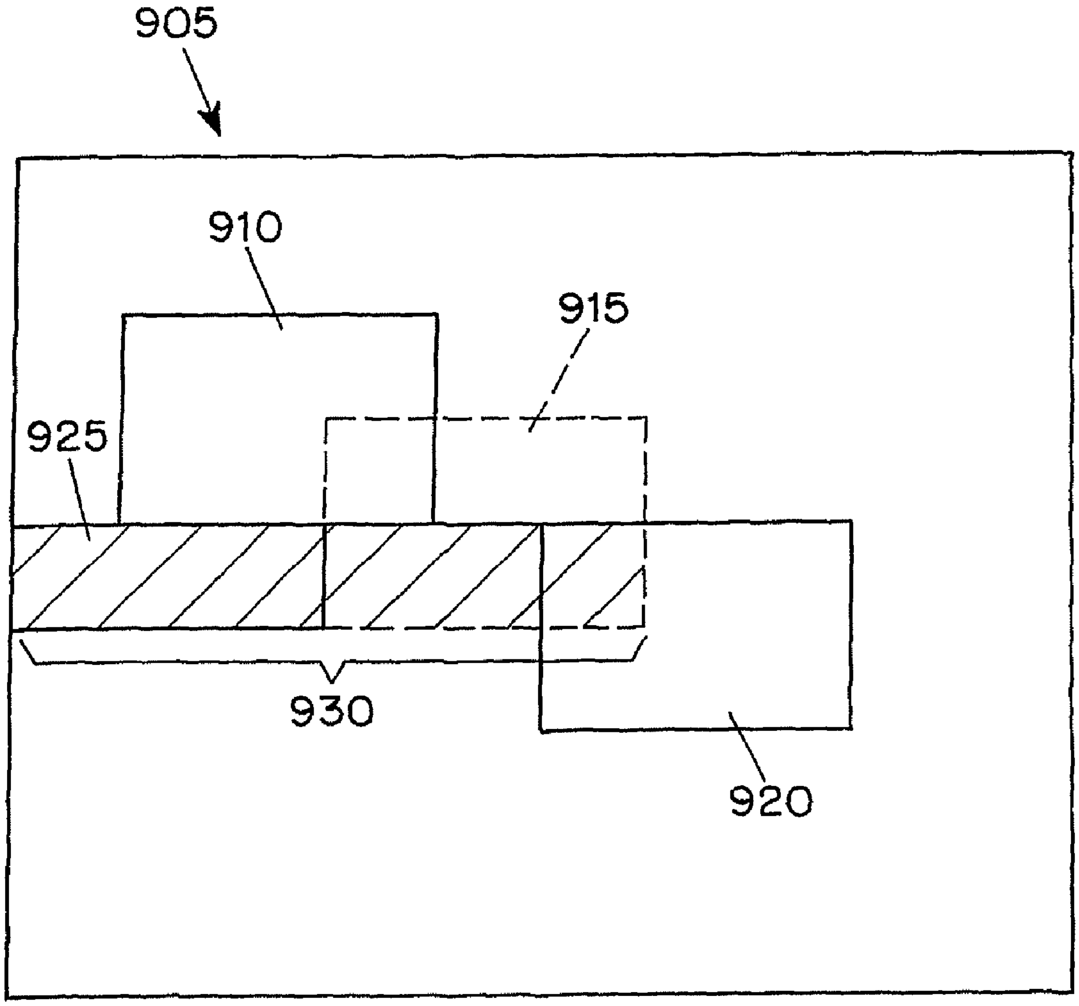
FIG. 9 is a pictorial diagram illustrating the removal of an overlapping full-space rectangle.

FIG. 8 is a flow chart which further describes the process of redetermining the empty-space representation of a workspace upon removal of a full-space rectangle. The four edges of the full-space rectangle to be removed are identified (step 850). As described in connection with FIG. 7, as the rectangles are generally axis aligned with the workspace, the edges can be described as left, right, bottom and top. As the process is applicable to those environments which allow overlapping full-space rectangles, the process also identifies edges of underlying full-space rectangles which are within the extents of the rectangle to be removed (step 855). This is further illustrated in FIG. 9, where full-space rectangle 915 which overlaps full-space rectangles 910 and 920 is to be removed. Upon removal of full-space rectangle 915, only a portion of the area underlying full-space rectangle 915 is empty-space. The edges of full-space rectangles 910, 920 which are within the extents of full-space rectangle 915 will limit the combination of free space rectangles. For example, in processing the left edge of rectangle 915, the combination of empty-space rectangle 925 and the region of full-space rectangle 915 will only extend to the point of intersection with the left edge of full-space rectangle 920, as illustrated by the hatching indicating output rectangle 930.

Returning to FIG. 8, after the interior intersecting edges of full-space rectangles are identified, the first edge of the full-space rectangle to be removed from the workspace is selected (step 860). All largest empty-space rectangles in the empty-space representation which are adjacent to the selected edge are identified (step 865). Each of the identified empty-space rectangles are selected in turn and to the extent that the rectangles are adjacent and define a larger rectangular empty-space, the rectangles are merged to generate output empty-space rectangles (step 870).

Each merged empty-space rectangle of step 870 is tested to determine if it is a subset of any other empty-space rectangle (step 875). If the answer in step 875 is yes, then the empty-space rectangle of step 870 is dropped from further processing (step 880). Processing continues by testing the set of largest empty-space rectangles adjacent to the current edge to determine if all empty-space rectangles have been tested (step 885). If not, the next empty-space rectangle adjacent to the current edge is selected (step 886) and processing returns to step 870. If in step 885, all empty-space rectangles adjacent to the current edge have been tested, the set of edges of the full-space rectangle to be removed is tested to determine if all edges have been processed (step 887). If not, the next edge is selected (step 888) and processing returns to step 865. If all edges of the full-space rectangular have been evaluated, then processing is complete.

Returning to step 875, if the resulting empty-space rectangle is not a subset of another empty-space rectangle, the output empty-space rectangle from step 870 is then tested to determine whether it is a largest empty-space rectangle (step 890). The testing of step 890 can be performed in a manner substantially as described in connection with FIG. 6. If the output rectangle is a largest empty-space rectangle, it is added to the empty-space representation (step 892) and processing continues by determining if more adjacent empty-space rectangles are available for processing (step 885). If in step 890 the current output rectangle is not a largest empty-space rectangle, the output rectangle is retained as an input parameter for subsequent recursive processing operations (step 894). Thus, the output rectangle is added to the set of empty-space rectangles which are evaluated in subsequent iterations of step 865.

FIG. 13 is a pseudo code listing illustrating one example of an implementation of the process for deleting a full space rectangle from the workspace representation. It will be appreciated that this embodiment is merely illustrative and that various programming implementations can be used in any number of programming languages to implement the present invention.

There are any number of ways of storing and querying the representation of the workspace. Various known data structures may offer benefits regarding storage space efficiency or query efficiency. In one embodiment, the space management method maintains a first data structure for storing data relating the full-space rectangles in the workspace and a second data structure for storing data relating the largest empty-space rectangles in the work space. In the case of a two dimensional workspace, the first and second data structures can take the form of a 2D interval tree. For higher order dimensional workspaces of dimension n, an n-dimensional interval tree can be used.

In the operation of adding a full-space rectangle as described above, the representation of the empty-space prior to the add operation is generally overwritten by the new representation. In such a case, the ability to efficiently undo an add or delete operation is lost. An undoable add operation can be implemented by saving a copy of at least a portion of the data structures of the work space representation prior to the add operation. To the extent that computer memory or other digital storage is available, several prior versions of the data structures of the work space representation can be stored, such that a multi-operation undo can also be implemented. Preferably, only the affected portions of the data structures need to be copied and saved. For example, in an undoable add operation, those empty space rectangles which are removed as a result of the add operation can be saved and those new empty space rectangles which are added to the workspace representation can be marked in the data structure. To undo the add operation, the marked entries in the data structure are removed and the previously removed empty space rectangles are reinstantiated in the data structure.

In addition to providing an efficient way to restore a previous display state of the workspace, the undoable add operation can be used to animate selected objects more quickly than if the objects were repeatedly added and deleted as discussed above. For example, a full-space rectangle having an object to be animated is first deleted from the workspace. Next an undoable add operation is used to place a modified version of the object in accordance with a frame of the animation. The undoable add operation is then undone, and a newly modified object is added in its place, again using an undoable add operation for the next frame of the animation.

The present space management methods are suitable for a wide range of graphics applications, such as window manager programs, graphical data presentation tools, electronic book displays and the like.

Figure 14B:
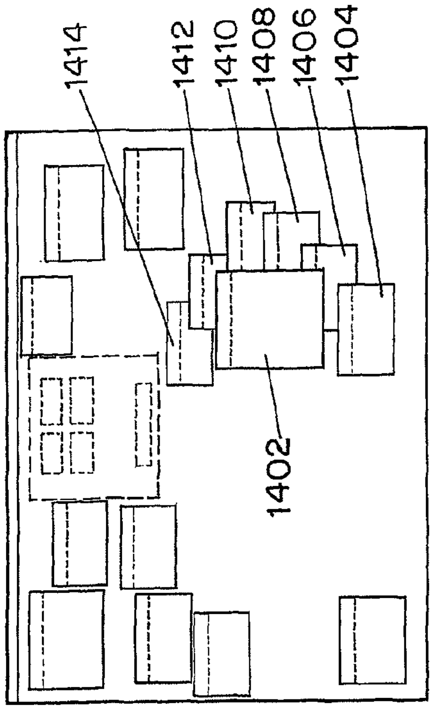
FIGS. 14A, 14B, 14C and 14D are pictorial representations of a computer display in an embodiment of the present invention as a window manager.
Figure 14D:
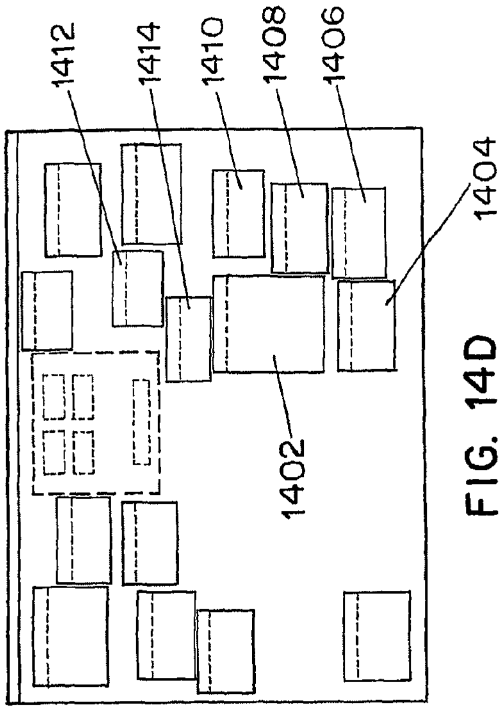
Figure 14A:
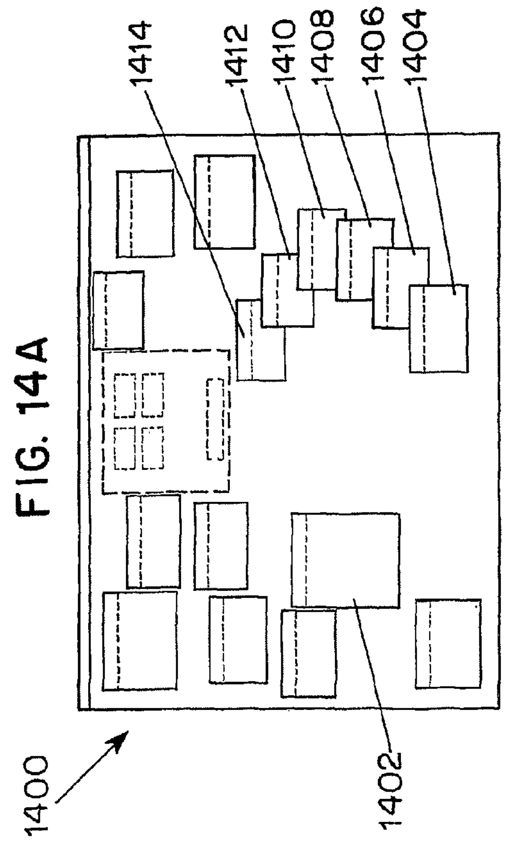

In the case of a window manager program, such as illustrated in the exemplary embodiments of FIG. 14A, FIG. 14B, FIG. 14C, and FIG. 14D, the current dynamic space management methods enable several features with respect to adding, deleting and moving content on the display. FIG. 14A illustrates a workspace 1400, which in this case is a computer display for a window based operating system. On the workspace are displayed a number of full-space rectangles, including 1402, 1404, 1406, 1408, 1410, 1412 and 1414. In this initial placement, a number of the rectangles 1404, 1406, 1408, 1410, 1412 and 1414 are placed in an overlapping fashion. FIG. 14B illustrates the conventional placement of the rectangles if a user simply moves rectangle 1402 to a new position which overlaps rectangles 1404, 1406, 1408, 1410, 1412 and 1414.

Figure 14C:
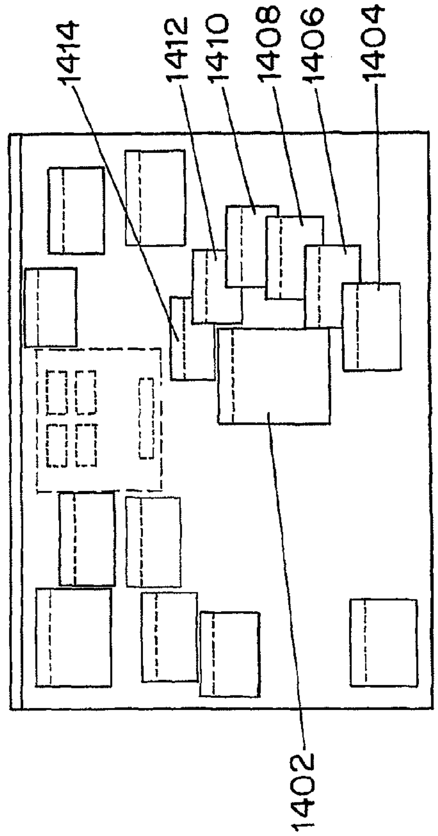

FIG. 14C illustrates an example of an overlap avoidance drag operation in accordance with the invention which repositions rectangle 1402 from the position in FIG. 14B to the closest non-overlapping position illustrated in FIG. 14C. In this case, the rectangles 1404, 1406, 1408, 1410, 1412 and 1414 are not repositioned. FIG. 14D illustrates the workspace resulting from an alternate embodiment of an overlap avoidance drag operation in accordance with the invention. In this case, the system maintains the placement of the dragged rectangle 1402 but rearranges the rectangles 1404, 1406, 1408, 1410, 1412 and 1414 to new positions to avoid overlap. The selection of placement parameters for rectangle 1402, and those rectangles which would be affected by a drag operation of rectangle 1402, are generally user established parameters which are based on user preferences and application specific requirements. For example, a first user may prefer the results of FIG. 14C whereas a second user would prefer the results of FIG. 14D. In either case, the present method of managing a workspace provides a data structure representing the available empty space which can be queried to determine a set of possible positions for a given object of full space. The user parameters are then used to select among the available empty-space rectangles and to establish a final position of the full-space on the workspace. This enables the arrangement of full-space to accommodate a vast range of user preferences.

As noted above, the current methods maintain a representation of the full-space and the empty-space of the workspace. When a full-space rectangle is to be moved or resized, it is first deleted from the full-space representation and the empty-space representation is updated. During the move, space management for overlap avoidance can take place continuously throughout the move operation or can be performed at the end of the move operation. In the first case, as the user selects a full-space rectangle and drags the selected rectangle to a new position on the work space, any other full-space rectangles which are in the drag path and would intersect the selected full space rectangle can be dynamically moved out of the way into other empty-space regions. Alternatively, the space management can take place after a user completes the move. In this later case, automatic positioning can involve either moving any full-space rectangles which are overlapped by the new placement of the moved object or by adjusting the final position of the moved object, such as into the closest available position that will satisfy the current placement parameters set by the user, such as, size and aspect ratio of the full-space rectangle.

If desired, the system can be allowed to alter the size and or aspect ratio within predefined limits set by a user to provide for placement during a move operation. For example, if a predetermined size scaling factor of 0.8 is used, than the system would be allowed to place a moved rectangle in an empty-space rectangle having a suitable aspect ratio and a size in the range of 0.8 to 1.0 of the size of the original full-space rectangle. Alternatively, if the user established that the position of a full-space rectangle was critical, than the system could be provided with an option of maintaining the position and aspect ratio of the full-space rectangle and scaling the size of the full-space rectangle to fit the available empty-space rectangle at the selected position. Other positioning and sizing parameters can also be set by a user to control the final placement of the full space rectangle on the workspace, such as total area, minimum and/or maximum dimensions, and even relative parameters such as “next to rectangle x,” “above rectangle y,” and the like, where x and y can represent objects already placed on the workspace.

Figure 10A:
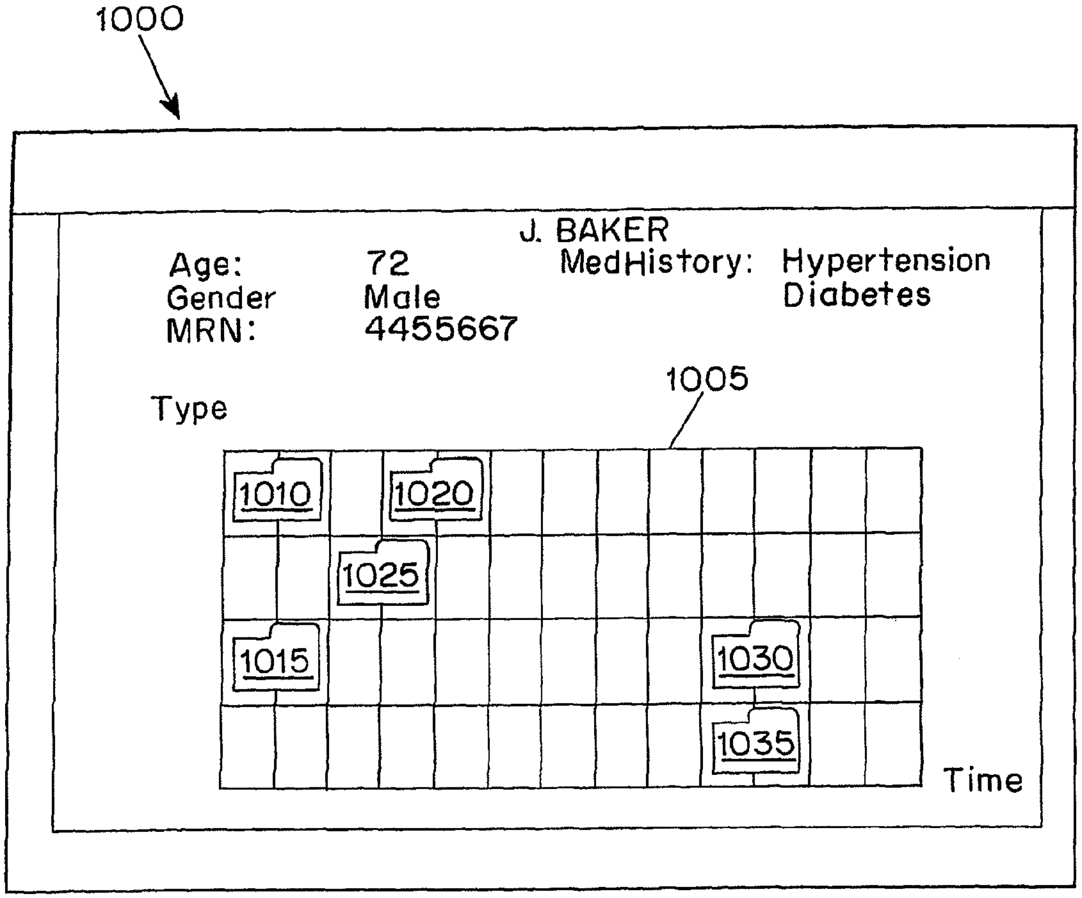
FIGS. 10A and 10B are pictorial diagrams illustrating an exemplary application of the present space management methods in connection with an information visualization system.
Figure 10B:
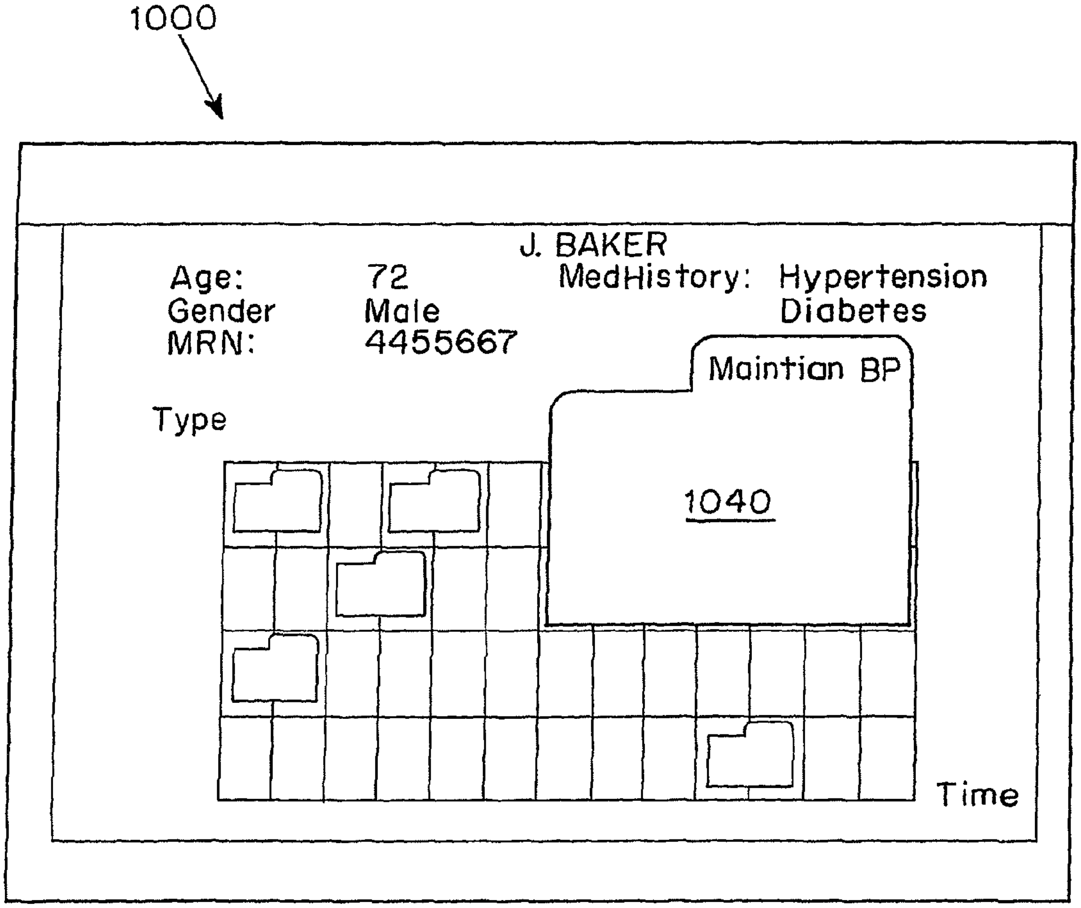

FIGS. 10A and 10B are pictorial representations of an application of the present space management methods in connection with a three dimensional information visualization system. While such a system can be used in any number of specific applications, the application will be described in the context of a medical information system. The pictorial diagram of FIG. 10A depicts a workspace 1000 which represents a patient treatment timeline. Along a time line grid 1005 a number of folder icons 1010, 1015, 1020, 1025, 1030, 1035 are displayed on the workspace which are indications that detailed information regarding the patient, such as signs, symptoms, indications, treatment rendered, medication provided and the like, is available for a particular time period. In order to access the information, one of the folders can be selected to be brought to the foreground and enlarged. However, since the time line features other important patient data in other folders which may need to be accessed simultaneously, it would be disadvantageous for the folder which was brought forward to overlap another folder displayed on the background. As set forth above, it is not required, and in some cases not desired, that all content which is displayed on the workspace participate in the data structures which define full space and empty space on the workspace. In this case, the background timeline grid 1005 is content which is intended to have other objects placed in an overlapping relationship to it. Therefore, the full space rectangle which defines the background timeline grid 1005 can either be displayed without ever adding it to the full-space representation or it can added initially and then deleted from the full space representation without removing the content from the display. The space manager can query the empty space representation, which includes the area of the background timeline grid 1005, for the largest available empty-space rectangle to receive the enlarged folder. The folder can then be dynamically enlarged, while generally maintaining the original aspect ratio, to fit within the selected empty-space rectangle. This is illustrated in FIG. 10B where folder 1035 of FIG. 10A has been selected, brought to the foreground and enlarged as folder 1040.

Figure 11A:
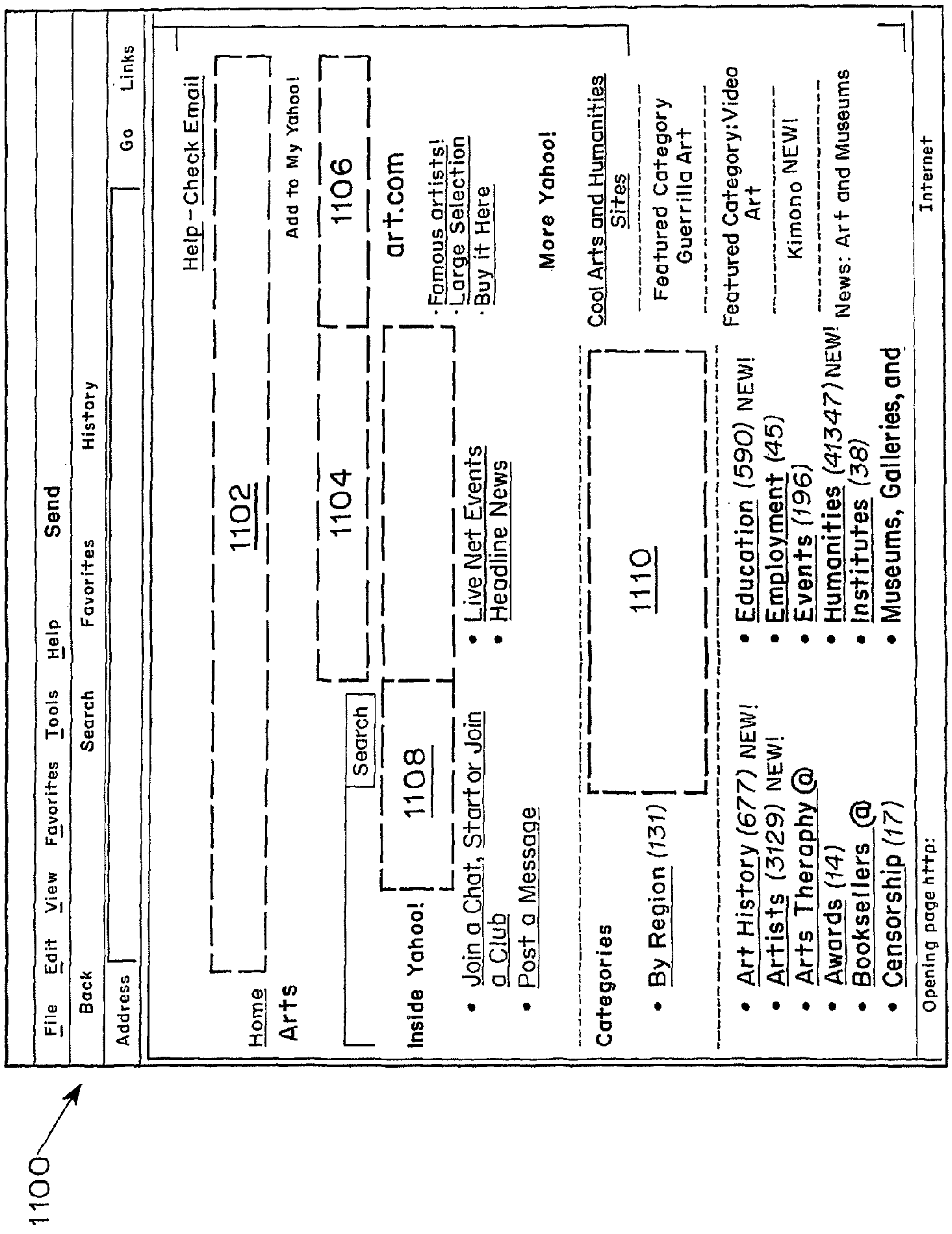
FIGS. 11A and 11B are pictorial diagrams illustrating an exemplary application of the present space management methods in connection with the placement of insertable content within a webpage.
Figure 11B:
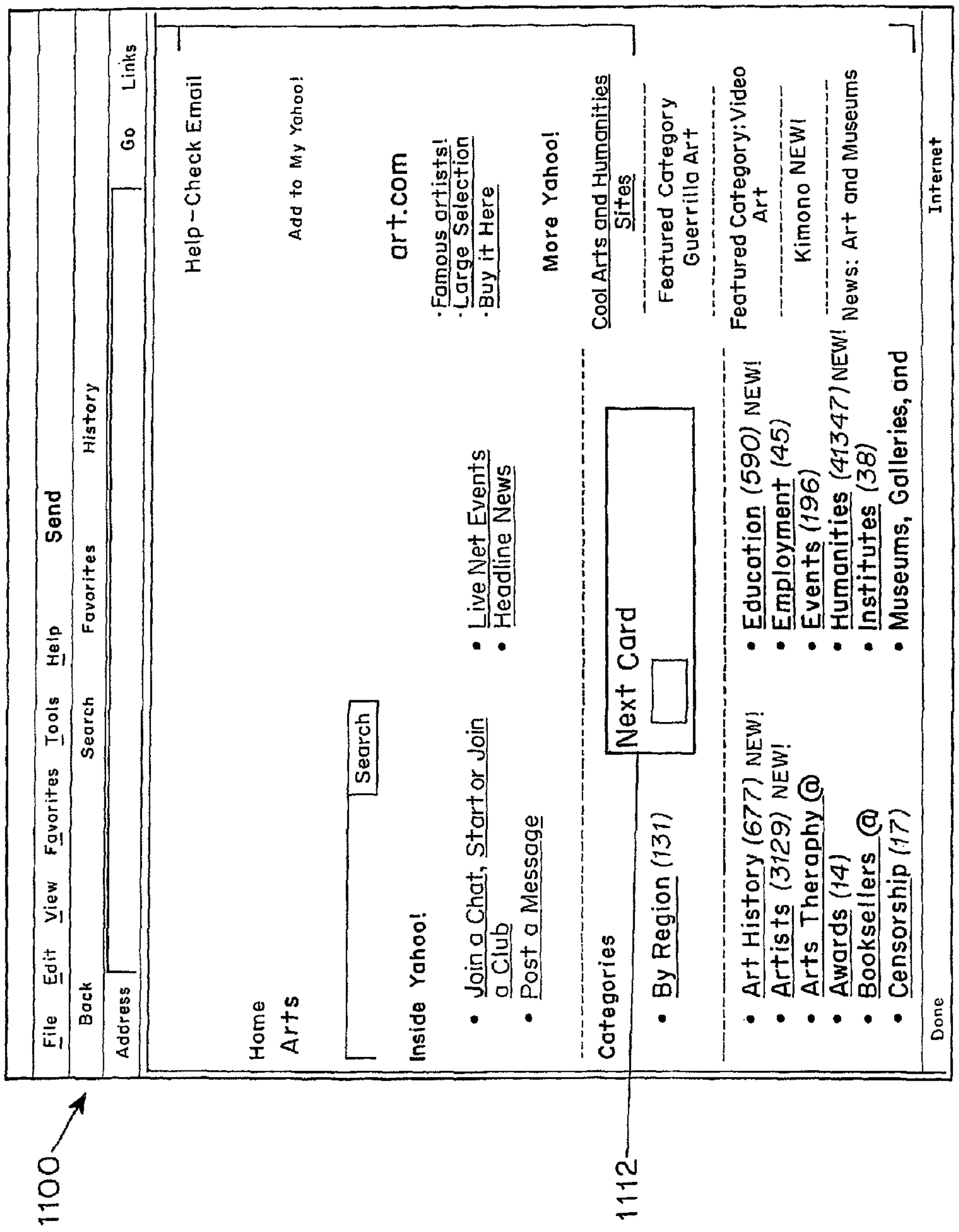

The present space management methods are also well suited to various electronic publishing and online content management applications. FIGS. 11A and 11B illustrate the use of the present space management methods for use in dynamic placement of advertising content within a web page. The workspace 1100 of FIG. 11 illustrates a typical web browser page with various content from an Internet Service Provider (ISP) being displayed. It is well known that advertising can be inserted into such web pages, such as through banner advertisements which are generally placed in a predetermined portion of the content page specifically reserved for such content. Using the present dynamic space management methods, an empty-space representation can be generated for a webpage to identify those areas which are available to receive advertising or other insertable content without specifically reserving a portion of the display for such content. For example, largest empty space rectangles 1102, 1104, 1106, 1108 and 1110 are representative empty-space rectangles which are available to receive insertable content. Referring to FIG. 11B, a block of advertising content 1112 can be inserted as a full space rectangle having a defined size and aspect ratio which can be received by empty space rectangle 1110.

The various systems and methods can be implemented as computer software which can be operated by any number of conventional computing platforms. For example, an IBM® compatible personal computer operating with an Intel Pentium III® processor, having 256 MB of RAM and operating the Windows® 2000 operating system has been found suitable for applications such as those illustrated and described in connection with FIGS. 10 and 11. Suitable software can be generated in any conventional programming language or environment, such as Java 1.2. It will be appreciated that such software can be embodied in computer readable media such as various forms of computer memory, hard disk drives, CD-ROM, diskette and the like.

The invention has been described in the context of a two dimensional work space represented by a list of full space rectangles and a list of empty space rectangles to represent the workspace. However, the invention is not limited to applications in two dimensions. The methods described are well suited for extension to three or more (n) dimensions. In the 3D case, rather than using planar rectangles in the representation, 3D axis-aligned cuboid bounds can be used as the basis of representation. The 3D full-space cuboids are then processed to generate a list of empty-space cuboids that represent the empty space in 3D.

One application of 3D space management is to represent 3D physical space. For example, warehouse management systems could use such a representation to maximize space utilization while still maintaining enough space to physically retrieve inventory. In general, given a 3D layout, the present methods for representing and managing a workspace makes it easy to compute the placement or movement of objects in the empty space.

In addition, while the dimensions of the workspace have generally been described as spatial, one or more of the dimensions in the representation can represent nonspatial dimensions. For example, one dimension could be mapped to time. Thus, in a 3D system, the use of two spatial dimensions and one temporal dimension could enable queries for finding an optimal place for storing an object based on its 2D footprint and the duration for which it must be stored. In a exemplary 4D space manager, three dimensions might be devoted to space and one to time. Of course, this can be extended to further dimensions and dimensional parameters, as required.

The workspace has generally been considered to be planar for the sake of simplicity in the explanation. However, this is not required. The current methods can also be applied to a workspace that is continuous, or that "wraps around" the left and right edges of the rectangular workspace. Alternatively, the rectangular space manager can be mapped to the surface of a sphere or a cylinder. This enables modeling such objects as the surface of the earth, or the space above the earth, or processing a cylindrical or spherical wrap-around information space for an immersive wearable user interface. Wrapping the bottom and top edges of the workspace also allows the present methods to be extended to model toroidal information surfaces.

Although the present invention has been described in connection with several exemplary embodiments, it will be appreciated that various changes and modifications may be suggested to one skilled in the art. It is intended that the present invention encompass such changes and modifications as fall within the scope of the appended claims.

We claim:

1. A method for space management of a workspace comprising:

- allocating at least one full-space rectangle of the workspace;
- defining a first data structure for representing at least a portion of full-space rectangles to be present on the workspace, wherein said at least a portion of the full-space rectangles are permitted to overlap;
- defining a second data structure of largest empty-space rectangles available on the workspace;
- performing an operation on the workspace involving at least one full-space rectangle; and
- redefining the first data structure and the second data structure in accordance with the workspace resulting from the performing step; and
- retaining a copy of at least a portion of the first and second data structures prior to performing said redefining step.

2. The method of space management according to claim 1, wherein the operation performed on at least one full-space rectangle is selected from the group consisting of adding a new full-space rectangle, deleting an existing full-space rectangle and moving an existing full-space rectangle.

3. The method of space management according to claim 2, wherein the operation is the addition of a new full-space rectangle which is manually placed by a user.

4. The method of space management according to claim 2, wherein the operation is the addition of a new full-space rectangle which is automatically placed in a final position on the workspace.

5. The method of space management according to claim 4, wherein the operation of automatically placing the full-space rectangle further comprises:

- querying the second data structure to identify candidate largest empty space rectangles which satisfy at least one user defined placement parameter;
- selecting one of the candidate largest empty space rectangles; and
- placing the full-space rectangle within the selected candidate largest empty space rectangle.

6. The method of space management according to claim 5, wherein the placement parameter includes a minimum area for the full-space rectangle being placed.

7. The method of space management according to claim 5, wherein the placement parameter includes a minimum linear dimension for the full-space rectangle being placed.

8. The method of space management according to claim 5, wherein the placement parameter includes an aspect ratio for the full-space rectangle being placed.

9. The method of space management according to claim 5, wherein if a plurality of candidate largest empty-space rectangles are available, the selecting operation is performed in accordance with at least one user defined quality measure.

10. The method of space management according to claim 9, wherein the quality measure is the empty-space rectangle which is closest in position to an initial placement of the full-space rectangle.

11. The method of space management according to claim 9, wherein the quality measure is the empty-space rectangle which is the smallest candidate empty space rectangle.

12. The method of space management according to claim 5, wherein the size of the full-space rectangle to be added can be reduced by an amount up to a predetermined scaling factor and wherein the candidate largest empty-space rectangles include those empty-space rectangles which are at least as large as the original size reduced by the scaling factor.

13. The method of space management according to claim 5, wherein if not largest empty space rectangles satisfy the user defined placement parameter, the user can optionally place the full space rectangle on the workspace.

14. The method of space management according to claim 1, wherein the operation performed includes adding a new full-space rectangle to the workspace and the step of redefining the first and second data structures further comprises:

- adding an entry representing the new full-space rectangle to the first data structure;
- removing entries from the second data structure representing largest empty space rectangles which are intersected by the new full space rectangle;
- and adding entries to the second data structure representing the set of new largest empty-space rectangles resulting from the placement of the new full space rectangle.

15. The method of space management according to claim 1, wherein the step of redefining the second data structure further comprises removing entries which are intersected by a full space rectangle following performing the operation.

16. The method of space management according to claim 1, further comprising performing an undo operation of the performed operation by redefining the first and second data structures in accordance with the retained copies of the at least a portion of the first data structure and second data structure.

17. The method of space management according to claim 16, wherein the operation is an undoable add operation, and wherein the at least a portion of the second data structure which is copied is a set of rectangles which are removed from the second data structure as a result of the operation, and wherein empty space rectangles added to the second data structure as a result of the operation are marked for a subsequent removal in the event of an undo operation.

18. The method of space management according to claim 1, wherein the operation is a deletion operation and wherein the step of redefining the second data structure further comprises:

a. identifying the edges of the full-space rectangle to be deleted;

b. selecting a first edge of the full-space rectangle to be deleted;

c. identifying each empty-space rectangle in the second data structure which is adjacent to the selected edge;

d. merging the adjacent empty-space rectangles with empty-space generated by deleting the full-space rectangle;

e. adding the merged empty-space rectangle to the second data structure if the merged empty-space rectangle is a largest empty-space rectangle;

f. dropping the merged empty-space rectangle if it is a subset of a previously identified largest empty-space rectangle;

g. saving the merged empty-space rectangle as an input empty space rectangle for a subsequent merging operation of step d if the merged empty-space rectangle is not added or dropped;

h. selecting a next edge; and i repeating steps c through h for each edge identified in step c.

19. The method of space management according to claim 1, wherein the workspace is a three dimensional workspace.

20. The method of space management according to claim 19, wherein the workspace is physical workspace.

21. The method of space management according to claim 19, wherein at least one of the dimensions of the workspace is time.

22. A method of operating a display device in a computer system, the method comprising:

providing a display workspace on the display device wherein content to be displayed to a user is defined in a plurality of full-space rectangles positioned on the workspace wherein at least a portion of the full-space rectangles are permitted to overlap;

storing in computer readable media a first data structure representing at least a portion of the plurality of full-space rectangles present on a workspace of the display device;

storing in computer readable media a second data structure of largest empty-space rectangles available on the workspace, the largest empty space rectangles being defined, at least in part, by the placement of the portion of the plurality of full-space rectangles stored in the first data structure;

performing a user operation on at least one full-space rectangle on the workspace; and redefining the first data structure and the second data structure stored in the computer readable media in accordance with the workspace resulting from the performing step; and retaining a copy of at least a portion of the first and second data structures prior to performing said redefining step.

23. A method for space management of a workspace provided on a display comprising:

defining a first data structure for representing at least a portion of full-space rectangles to be present on the workspace, wherein said at least a portion of the full-space rectangles are permitted to overlap;

defining a second data structure of largest empty-space rectangles available on the workspace;

initiating an operation to be performed on the workspace involving at least one full-space rectangle which is to be added to the first data structure; and querying the second data structure to determine the candidate largest empty-space rectangles on the workspace which can accommodate the operation to be performed;

selecting one of the candidate largest empty-space rectangles based on at least one selection parameter;

performing the operation;

redefining the first data structure and the second data structure in accordance with the workspace resulting from the performing step; and retaining a copy of at least a portion of the first and second data structures prior to performing said redefining step.

* * * * *

UNITED STATES PATENT AND TRADEMARK OFFICE

CERTIFICATE OF CORRECTION

PATENT NO. : 8,234,580 B2
APPLICATION NO. : 12/124797
DATED : July 31, 2012
INVENTOR(S) : Blaine A. Bell and Steven A. Feiner It is certified that error appears in the above-identified patent and that said Letters Patent is hereby corrected as shown below:

At column 17, line 34, claim 1:

"least one full-space rectangle; and" should read

-- least one full-space rectangle; --

Signed and Sealed this
Twentieth Day of November, 2012

David J. Kappos
*Director of the United States Patent and Trademark Office*